US005790449A

United States Patent [19]

Kanbe et al.

[11] Patent Number: 5,790,449

[45] Date of Patent: Aug. 4, 1998

[54] METHOD OF DRIVING OPTICAL MODULATION DEVICE

[75] Inventors: Junichiro Kanbe; Kazuharu Katagiri, both of Yokohama; Syuzo Kaneko, Tokyo, all of Japan

[73] Assignee: Canon Kabushiki Kaisha, Tokyo, Japan

[21] Appl. No.: 462,978

[22] Filed: Jun. 5, 1995

Related U.S. Application Data

[62] Division of Ser. No. 139,162, Dec. 21, 1987, Pat. No. 5,448,383, which is a continuation of Ser. No. 7,408, Jan. 27, 1987, abandoned, which is a continuation of Ser. No. 598,800, Apr. 10, 1984, Pat. No. 4,665,561.

[30] Foreign Application Priority Data

| | | | |
|---|---|---|---|
| Apr. 19, 1983 | [JP] | Japan | 58-68659 |
| Apr. 19, 1983 | [JP] | Japan | 58-68660 |
| Jul. 30, 1983 | [JP] | Japan | 58-138707 |
| Jul. 30, 1983 | [JP] | Japan | 58-138710 |
| Aug. 4, 1983 | [JP] | Japan | 58-142954 |

[51] Int. Cl.$^6$ .......... G01G 3/36

[52] U.S. Cl. .......... 345/97; 345/94

[58] Field of Search .......... 345/94, 87, 95, 345/96, 97, 98, 101, 55, 58, 208, 209, 210; 348/790, 792, 793; 359/54, 55, 56; 349/33, 34, 37, 54

[56] References Cited

U.S. PATENT DOCUMENTS

| | | | |
|---|---|---|---|
| 3,776,615 | 12/1973 | Tsukamoto et al. | 350/333 |
| 3,835,463 | 9/1974 | Tsukamoto et al. | 340/324 |
| 3,909,804 | 9/1975 | Kaji et al. | 345/208 |
| 3,911,421 | 10/1975 | Alt et al. | 340/324 |
| 3,936,815 | 2/1976 | Kogure et al. | 345/94 |
| 3,973,252 | 8/1976 | Mitomo et al. | 340/324 |
| 3,976,362 | 8/1976 | Kawakami | 345/95 |
| 3,995,942 | 12/1976 | Kawakami et al. | 350/333 |
| 4,040,720 | 8/1977 | York | 350/339 R |
| 4,040,721 | 8/1977 | Kurita | 345/87 |
| 4,060,801 | 11/1977 | Stein et al. | 340/324 |
| 4,062,626 | 12/1977 | Kawakami et al. | 350/332 |
| 4,082,430 | 4/1978 | Schulthess et al. | 350/333 |

(List continued on next page.)

FOREIGN PATENT DOCUMENTS

| | | | |
|---|---|---|---|
| 0032362 | 7/1981 | European Pat. Off. | G02F 1/137 |
| 0091661 | 10/1983 | European Pat. Off. | G02F 1/137 |
| 1764966 | 8/1972 | Germany . | |
| 2138946 | 2/1973 | Germany . | |
| 2406093 | 2/1974 | Germany . | |
| 2347093 | 4/1974 | Germany . | |
| 2449543 | 5/1975 | Germany . | |
| 56-107216 | 8/1981 | Japan . | |
| 56-98073 | 8/1981 | Japan | H04N 1/02 |
| 56-98967 | 8/1981 | Japan | H04N 1/02 |
| 57-120466 | 7/1982 | Japan | B41J 3/21 |
| 1525405 | 9/1978 | United Kingdom | G09F 9/30 |
| 2075738 | 11/1981 | United Kingdom . | |
| 2079509 | 1/1982 | United Kingdom . | |
| 2117157 | 10/1983 | United Kingdom . | |
| 2129182 | 5/1984 | United Kingdom . | |
| 2164776 | 3/1986 | United Kingdom | G09G 3/36 |
| 2173336 | 10/1986 | United Kingdom | G09G 3/36 |
| 2173337 | 10/1986 | United Kingdom | G09G 3/36 |
| 2175726 | 12/1986 | United Kingdom | G09G 3/20 |

OTHER PUBLICATIONS

Chem. Abstracts, vol. 93: 56815r.
Chem. Abstracts, vol. 94: 56716w.
Chem. Abstracts, vol. 94: 166242w.
Chem. Abstracts, vol. 95: 89702n.
Chem. Abstracts, vol. 96: 133710k.
Chem. Abstracts, vol. 97: 47754s.
Chem. Abstracts, vol. 97: 171523e.
Chem. Abstracts, vol. 97: 228104a.
Chem. Abstracts, vol. 98: 26192n.
Chem. Abstracts, vol. 99: 14059g.
Chem. Abstracts, vol. 99: 222188a.

Uemoto et al., "Ferroelectric Properties of Chiral Smetic Liquid Crystal", Japanese J. of Applied Physics, vol. 18, No. 7, Jul. 1979, at 1261–1265.

Handschy et al., "Stroboscopic Microscopy of Fast Electro–Optic Switching in Ferroelectric Smectic C Liquid Crystals", Appl. Phys. Lett. 41(1), Jul. 1, 1982, at 39–41.

Clark et al., "Ferroelectric Liquid Crystal Electro–Optics Using the Surface Stabilized Structure", Molecular Crystals and Liquid Crustals, vol. 94, No. 1 & 2, at 213–233 (1983).

Clark et al., "Submicrosecond bistable electro–optic switching in liquid crystals", Appl. Phys. Lett., vol. 36, No. 11, pp. 839–901, Jun. 1980.

Meyer et al., "Ferroelectric Liquid Crystals", J. de Physique, vol. 36, pp. L–69–71 (Mar. 1975).

Robert et al., "Multiplexing Techniques for Liquid Crystal Displays", IEEE Transactions on Electron Devices, vol. ED–24, No. 6, pp. 694–697 (Jun. 1977).

*Primary Examiner*—Dennis-Doom Chow

*Attorney, Agent, or Firm*—Fitzpatrick, Cella, Harper & Scinto

[57] ABSTRACT

A liquid crystal apparatus includes a liquid crystal device having a group of scanning electrodes and a group of signal electrodes intersecting each other to form an electrode matrix, and a chiral smectic liquid crystal having a threshold voltage varying depending on a voltage pulse width disposed so as to form a picture element at each intersection of the scanning electrodes and the signal electrodes. The electrodes are driven by (a) applying a scanning selection signal and a scanning non-selection signal to the scanning electrodes, (b) applying data signals to the signal electrodes so as to apply a voltage to a selected picture element at an intersection of a selected scanning electrode receiving the scanning selection signal and a selected signal electrode, the voltage applied to the selected picture element being at least two times a voltage applied to a non-selected picture element at an intersection of a non-selected scanning electrode receiving the scanning non-selection signal and a selected or non-selected signal electrode, (c) periodically applying the scanning selection signal to the scanning electrodes, and (d) setting a voltage level of the voltage according to a local environmental temperature.

6 Claims, 25 Drawing Sheets

U.S. PATENT DOCUMENTS 4,117,472 9/1978 Freer et al. .............. 340/324
4,180,813 12/1979 Yoneda .............. 340/784
4,187,505 2/1980 Morley et al. .............. 340/753
4,206,459 6/1980 Houryu et al. .............. 340/765
4,290,686 9/1981 Suzuki et al. .............. 345/94
4,319,237 3/1982 Matsuo et al. .............. 345/101
4,342,994 8/1982 Lorteije .............. 340/784
4,367,924 1/1983 Clark et al. .............. 350/350 S
4,372,871 2/1983 Toriyama et al. .............. 252/299.61
4,404,555 9/1983 Long et al. .............. 340/784
4,419,664 12/1983 Crossland et al. .............. 350/350 S
4,427,978 1/1984 Williams .............. 340/784
4,443,062 4/1984 Togashi et al. .............. 350/332
4,508,429 4/1985 Nagae et al. .............. 350/350 S
4,511,926 4/1985 Crossland et al. .............. 358/236
4,529,271 7/1985 Berreman et al. .............. 350/333
4,548,476 10/1985 Kaneko .............. 350/350 S
4,563,059 1/1986 Clark et al. .............. 350/350 S
4,571,585 2/1986 Stein et al. .............. 340/784
4,638,310 1/1987 Ayliffe .............. 340/805
4,655,561 4/1987 Kanbe et al. .............. 350/350 S
4,693,563 9/1987 Harada et al. .............. 350/350 S
4,701,026 10/1987 Yazaki et al. .............. 350/333
4,711,531 12/1987 Masubuchi .............. 350/350 S
4,715,688 12/1987 Harada et al. .............. 350/350 S
4,725,129 2/1988 Kondo et al. .............. 350/350 S

METHOD OF DRIVING OPTICAL MODULATION DEVICE

This application is a division of application Ser. No. 07/139,162 filed on Dec. 21, 1987, now U.S. Pat. No. 5,408,383, issued Sep. 5, 1985, which is a continuation of application Ser. No. 07/007,408, filed on Jan. 27, 1987, abandoned, which is continuation of application Ser. No. 06/598,800 filed on Apr. 10, 1984, now U.S. Pat. No. 4,655,561, issued Apr. 7, 1987.

BACKGROUND OF THE INVENTION

1. Field of the Invention

The present invention relates to a method of driving an optical modulation device, e.g. liquid crystal device, and more particularly to a time-sharing driving method for a liquid crystal device for use in an optical modulation device, e.g. a display device, an optical shutter array or, etc.

2. Description of the Prior Art

Hitherto, liquid crystal display devices are well known, which comprise a group of scanning electrodes and a group of signal electrodes arranged in a matrix manner, and a liquid crystal compound is filled between the electrode groups to form a plurality of picture elements thereby to display images or information. These display devices employ a time-sharing driving method which comprises the steps of selectively applying address signals sequentially and cyclically to the group of scanning electrodes, and parallely effecting selective application of predetermined information signals to the group of signal electrodes in synchronism with address signals. However, these display devices and the driving method therefor have a serious drawback as will be described below.

Namely, the drawback is that it is difficult to obtain high density of a picture element or large image area. Because of relatively high response speed and low power dissipation, among prior art liquid crystals, most of liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, Applied Physics Letters Vol. 18, No. 4 (Feb. 15, 1971) pp. 127–128. In the liquid crystals of this type, molecules of nematic liquid crystal which show positive dielectric anisotropy under no application of an electric field form a structure twisted in the thickness direction of liquid crystal layers (helical structure), and molecules of these liquid crystals are aligned or oriented parallel to each other in the surfaces of both electrodes. On the other hand, nematic liquid crystals which show positive dielectric anisotropy under application of an electric field are oriented or aligned in the direction of the electric field. Thus, they can cause optical modulation. When display devices of a matrix electrode array are designed using liquid crystals of this type, a voltage higher than a threshold level required for aligning liquid crystal molecules in the direction perpendicular to electrode surfaces is applied to areas (selected points) where scanning electrodes and signal electrodes are selected at a time, whereas a voltage is not applied to areas (non-selected points) where scanning electrodes and signal electrodes are not selected and, accordingly, the liquid crystal molecules are stably aligned parallel to the electrode surfaces. When linear polarizers arranged in a cross-nicol relationship, i.e. with their polarizing axes being substantially perpendicular to each other, are arranged on the upper and lower sides of a liquid crystal cell thus formed, a light does not transmit at selected points while it transmits at non-selected points. Thus, the liquid crystal cell can function as an image device.

However, when a matrix electrode structure is constituted, a certain electric field is applied to regions where scanning electrodes are selected and signal electrodes are not selected or regions where scanning electrodes are not selected and signal electrodes are selected (which regions are so called "half-selected points"). If the difference between a voltage applied to the selected points and a voltage applied to half-selected points is sufficiently large, and a voltage threshold level required for allowing liquid crystal molecules to be aligned or oriented perpendicular to an electric field is set to a value therebetween, the displace device normally operates. However, in fact, according as the number (N) of scanning lines increases, a time (duty ratio) during which an effective electric field is applied to one selected point when a whole image area (corresponding to one frame) is scanned decreases with a ratio of 1/N. For this reason, the larger the number of scanning lies are, the smaller is the voltage difference as an effective value applied to a selected point and non-selected points when repeatedly scanned. As a result, this leads to unavoidable drawbacks of lowering of image contrast or occurrence of crosstalk. These phenomena result in problems that cannot be essentially avoided, which appear when a liquid crystal not having bistable property (which shows a stable state where liquid crystal molecules are oriented or aligned in a horizontal direction with respect to electrode surfaces, but are oriented in a vertical direction only when an electric field is effectively applied) is driven, i.e. repeatedly scanned, by making use of time storage effect. To overcome these drawbacks, the voltage averaging method, the two-frequency driving method, the multiple matrix method, etc. has already been proposed. However, any method is not sufficient to overcome the above-mentioned drawbacks. As a result, it is the present state that the development of large image area or high packaging density in respect to display elements is delayed because of the fact that it is difficult to sufficiently increase the number of scanning lines.

Meanwhile, turning to the field of a printer, as means for obtaining a hard copy in response to input electric signals, a Laser Beam Printer (LBP) providing electric image signals to electrophotographic charging member in the form of lights is the most excellent in view of density of a picture element and a printing speed.

However, the LBP has drawbacks as follows:

1) It becomes large in apparatus size.
2) It has high speed mechanically movable parts such as a polygon scanner, resulting in noise and requirement for strict mechanical precision, etc.

In order to eliminate drawbacks stated above, a liquid crystal shutter-array is proposed as a device for changing electric signals to optical signals. When picture element signals are provided with a liquid crystal shutter-array, however, 4000 signal generators are required, for instance, for writing picture element signals into a length of 200 mm in a ratio of 20 dots/mm. Accordingly, in order to independently feed signals to respective signal generators, lead lines for feeding electric signals are required to be provided to all the respective signal generators, and the production has become difficult.

In view of this, another attempt is made to apply on line of image signals in a time-sharing manner with signal generators divided into a plurality of lines.

With this attempt, signal feeding electrodes can be common to the plurality of signal generators, thereby enabling to remarkably lessen number of substantially required lead wires. However, if the number (N) of lines is increased while using a liquid crystal showing no bistability as usually practiced, a signal "ON" time is substantially reduced to 1/N. This results in difficulties that light quantity obtained on a photoconductive member is lessen, a crosstalk occurs, etc.

SUMMARY OF THE INVENTION

An object of the invention is to provide a novel method of driving an optical modulation device, particularly a liquid crystal device, which can solve all drawbacks encountered with prior art liquid crystal display devices or liquid crystal optical shutters as stated above.

Another object of the invention is to provide a liquid crystal device driving method which can realize high responsibility.

Another object of the invention is to provide a liquid crystal device driving method which can realize high density of a picture element.

Another object of the invention is to provide a liquid crystal driving method which does not produce crosstalk.

Another object of the invention is to provide a novel method of a driving liquid crystal device wherein the liquid crystal which shows a bistability with respect to an electric field, particularly a ferroelectric chiral smectic C- or H-phase liquid crystal is used.

Another object of the invention is to provide a novel driving method suitable for liquid crystal devices having a high density of picture elements and a large image area.

To achieve these objects, there is provided a method of an optical modulation device, e.g. a liquid crystal device having a matrix electrode arrangement comprising a group of scanning electrodes, a group of signal electrodes oppositely spaced from the group of scanning electrodes, and an optical modulation material (e.g. a liquid crystal) which shows bistability with respect to an electric field between the group of scanning electrodes and the group of signal electrodes the improvement wherein a voltage permitting the liquid crystal showing bistability to be oriented to a first stable state (one optically stable state) is applied between a scanning electrode selected from the group of scanning electrode and a signal electrode selected from the group of scanning electrodes, and a voltage permitting the liquid crystal showing bistability to be oriented to a second stable state (the other optically stable state) is applied between the selected scanning electrode and signal electrodes which are not selected from the group of signal electrodes;

or a voltage permitting the optical modulation material showing bistability to be oriented to the first stable state is applied between a scanning electrode selected from the group of scanning electrodes and the group of signal electrodes, and a voltage causing the liquid crystal oriented to the first stable state to be oriented to the second stable state is applied between the selected scanning electrode and a signal electrode selected from the group of signal electrodes; and a voltage having a value lying between a threshold voltage $V_{th2}$ (referring to a threshold voltage of the second stable state) and a threshold voltage $V_{th1}$ (referring to a threshold voltage of the first stable state) of the liquid crystal showing bistability is applied between scanning electrodes which are not selected from the group of the scanning electrodes and the group of signal electrodes.

DESCRIPTION OF THE PREFERRED EMBODIMENTS

Initially, as an optical modulation material used in a driving method according to the present invention, a material which shows either a first optically stable state or a second optically stable state depending upon an electric field applied thereto, i.e., bistability with respect to the applied electric field, particularly a liquid crystal having the above-mentioned property, may be used.

Preferable liquid crystals having bistability which can be used in the driving method according to the present invention are smectic, particularly chiral smectic liquid crystals having ferroelectricity. Among them, chiral smectic C (SmC*)- or H (SmH*)-phase liquid crystals are suitable therefor. These ferroelectric liquid crystals are described in, e.g. "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

More particularly, examples of ferroelectric liquid crystal compound used in the method according to the present invention are disiloxybensilidene-p'-amino-2-methylbutylcinnamate (DOBAMBC), hexyloxybenzilidene-p'-amino-2-chloropropylcinnamate (HOBACPC), 4-0-(2-methyl)-butylresorcilidene-4'-octylaniline (MBRA8), etc.

When a device is constituted using these materials, the device may be supported with a block of copper, etc. in which a heater is embedded in order to realize a temperature condition where the liquid crystal compounds assume an SmC*- or SmH*-phase.

Figure 1:
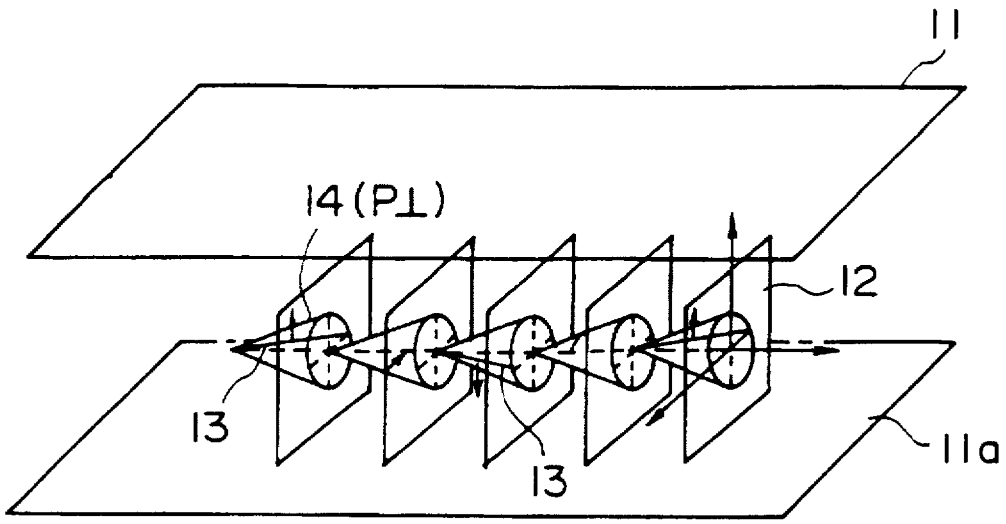
FIG. 1 is a perspective view schematically illustrating a liquid crystal device having a chiral smectic phase liquid crystal.
Figure 2:
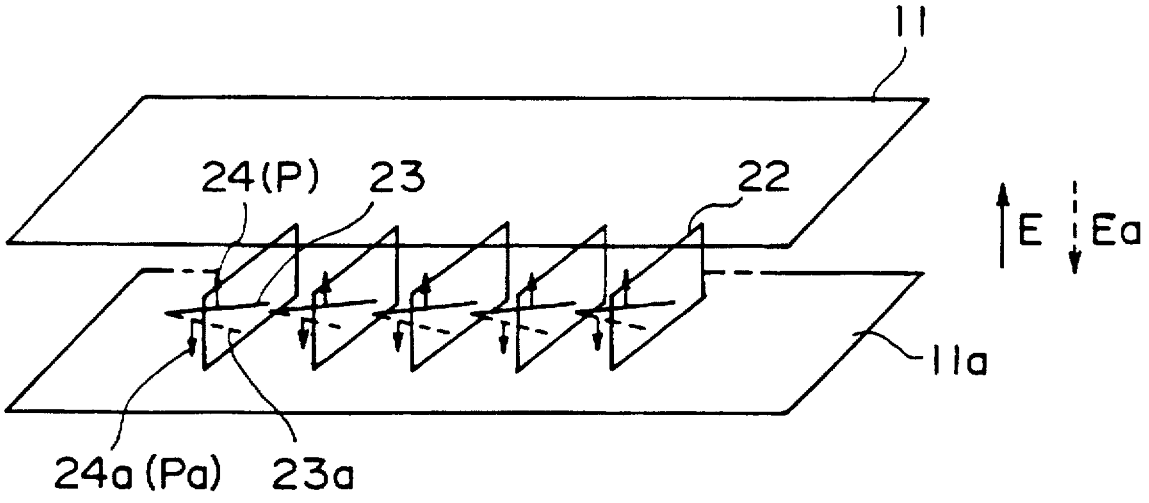
FIG. 2 is a perspective view schematically illustrating the bistability of the liquid crystal device used in the method of the present invention.

Referring to FIG. 1, there is schematically shown an example, of a ferroelectric liquid crystal cell. Reference numerals 11 and 11*a* denote base plates (glass plates) on which a transparent electrode of, e.g. $In_2O_3$, $SnO_2$, ITO (Indium-Tin Oxide), etc. is disposed, respectively. A liquid crystal of an SmC*-phase in which liquid crystal molecular layers 12 are oriented perpendicular to surfaces of the glass plates is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the base plates 11 and 11*a*, a helical structure of the liquid crystal molecule 13 is loosened to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship i.e. with their polarizing directions being crossing each other are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g. 1μ), the helical structure of the liquid crystal molecules is loosened without application of an electric field whereby the dipole moment assumes either of the two states, i.e. P in an upper direction 24 or Pa in a lower direction 24*a* as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24*a* depending on the vector of the electric field E or Ea. In correspondence with this, the liquid crystal molecules are oriented in either of a first stable state 23 and a second stable state 23*a*.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g. with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented in the second stable state 23*a*, whereby the directions of molecules are changed. Likewise, the latter state is kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible and generally 0.5μ to 20μ, particularly 1μ to 5μ. A liquid crystal-electrooptical device having a matrix electrode structure in which the ferroelectric liquid crystal of this kind is used is proposed e.g. in the specification of U.S. Pat. No. 4,367,924 by Clark and Ragerwall.

In a preferred embodiment according to the invention, there is provided a liquid crystal device comprising a group of scanning electrodes sequentially selected based on scanning signals, a group of signal electrodes oppositely spaced from the group of scanning electrodes, which signal electrodes are selected based on predetermined information signals, and a liquid crystal disposed between the both groups of electrodes. This liquid crystal device can be driven by applying an electric signal having phases $t_1$ and $t_2$ of which voltage levels are different from each other to a selected scanning electrode of the liquid crystal device and by applying to the signal electrodes electric signals of which voltage levels are different from each other depending upon whether there is a predetermined information or not, there occur an electric field directed in one direction which allows the liquid crystal to be oriented in a first stable state at a phase of $t_1$ ($t_2$) in a portion or portions where there is or are information signal or signals on the selected scanning electrode line, and an electric field directed in the opposite direction which allows the liquid crystal to be oriented in a second stable state at a phase of $t_2$ ($t_1$) in portions where any information signal does not exist, respectively. An example of the detail of the driving method according to this embodiment will be described with reference to FIGS. 3 and 4.

Figure 3:
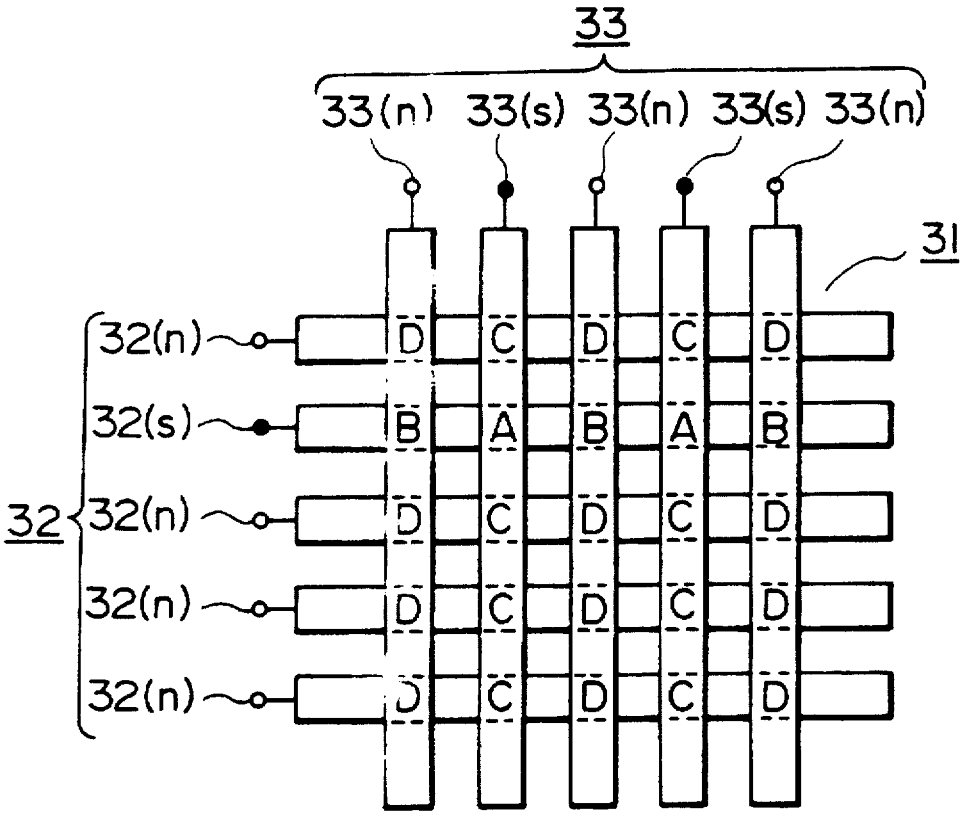
FIG. 3 is a schematic plan view illustrating an electrode arrangement of a liquid crystal device used in the driving method according to the present invention, FIG. 4A(a) shows a waveform of electric signals applied to a selected scanning electrode, FIG. 4A(b) shows a waveform of an electric signal applied to non-selected scanning electrodes, FIG. 4A(c) shows a waveform of an information signal applied to a selected signal electrode, FIG. 4A(d) shows a waveform of an information signal applied to non-selected signal electrodes, FIG. 4B(a) shows a waveform of a voltage applied to a liquid crystal corresponding to a picture element A, FIG. 4B(b) shows a waveform of a voltage applied to a liquid crystal corresponding to a picture element B, FIG. 4B(c) shows a waveform of a voltage applied to a liquid crystal corresponding to a picture element C, FIG. 4B(d) shows a waveform of a voltage applied to a liquid crystal corresponding to a picture element D, FIG. 5(*a*) shows a waveform of an electric signal of a selected scanning electrode in a second embodiment of the invention, FIG. 5(*b*) shows a waveform of an electric signal of non-selected scanning electrodes in the second embodiment, FIG. 5(*c*) shows a waveform of an information signal applied to a selected signal electrode in the second embodiment, FIG. 5(*d*) shows a waveform of an information signal applied to a non-selected signal electrode in the second embodiment, FIG. 6(*a*) shows a waveform of an electric signal of a selected scanning electrode in a third embodiment of the invention, FIG. 6(*b*) shows a waveform of an electric signal of a non-selected scanning electrode in the third embodiment, FIG. 6(*c*) shows a waveform of an information signal applied to a non-selected signal electrode in the third embodiment, FIG. 6(*d*) shows a waveform of an information signal applied to non-selected signal electrodes in the third embodiment, FIG. 7A(a) shows a waveform of an electric signal applied to a selected scanning electrode, FIG. 7A(b) shows a waveform of an electric signal applied to non-selected scanning electrodes, FIG. 7A(c) shows a waveform of an information signal applied to a selected signal electrode, FIG. 7A(d) shows a waveform of an information signal applied to non-selected signal electrodes, FIG. 7B(a) shows a waveform of a voltage applied to a liquid crystal corresponding to a picture element A, FIG. 7B(b) shows a waveform of a voltage applied to a liquid crystal corresponding to a picture element B, FIG. 7B(c) shows a waveform of a voltage applied to a liquid crystal corresponding to a picture element C, FIG. 7B(d) shows a waveform of a voltage applied to a liquid crystal corresponding to a picture element D, FIG. 8A(a) shows a waveform of an electric signal applied to a selected scanning electrode in a further embodiment, FIG. 8A(b) shows a waveform of an electric signal applied to non-selected scanning electrodes in the further embodiment, FIG. 8A(c) shows a waveform of an information signal applied to a selected signal electrode in the further embodiment, FIG. 8A(d) shows a waveform of an information signal applied to non-selected signal electrodes in the further embodiment, FIG. 8B(a) shows a waveform of a voltage applied to a liquid crystal corresponding to a picture element A in the further embodiment, FIG. 8B(b) shows a waveform of a voltage applied to a liquid crystal corresponding to a picture element B in the further embodiment, FIG. 8B(c) shows a waveform of a voltage applied to a liquid crystal corresponding to a picture element C in the further embodiment, FIG. 8B(d) shows a waveform of a voltage applied to a liquid crystal corresponding to a picture element D, FIGS. 9(*a*), 9(*b*), 9(*c*) and 9(*d*) are explanatory views each showing an example of a waveform of a voltage applied to a signal electrodes, respectively, FIG. 10A(a) shows a waveform of an electric signal applied to a selected scanning electrode, FIG. 10A(b) shows a waveform of a signal applied to non-selected scanning electrodes, FIG. 10A(c) shows a waveform of an information signal applied to a selected signal electrode, FIG. 10A(d) shows a waveform of an information signal applied to non-selected signal electrodes, FIG. 10B(a) shows a waveform of a voltage applied to a liquid crystal corresponding to a picture element A, FIG. 10B(b) shows a waveform of a voltage applied to a liquid crystal corresponding to a picture element B, FIG. 10B(c) shows a waveform of a voltage applied to a liquid crystal corresponding to a picture element C, FIG. 10B(d) shows a waveform of a voltage applied to a liquid crystal corresponding to a picture element D.
Figure 4A:
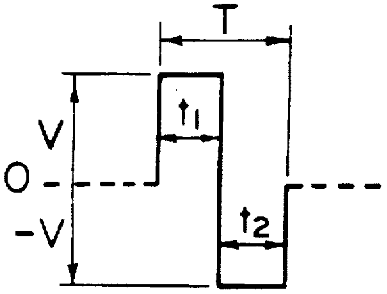
Figure 4A:
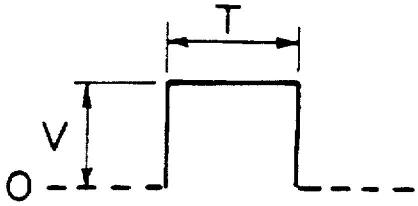
Figure 4A:
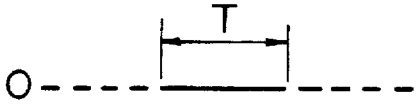
Figure 4A:
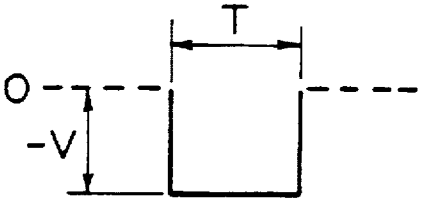
Figure 4B:
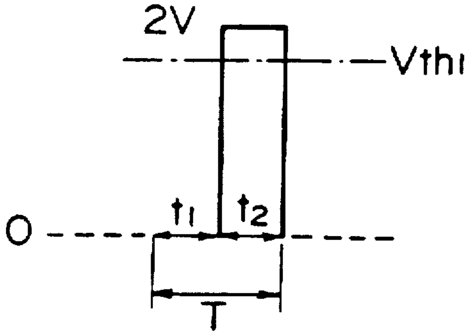
Figure 4B:
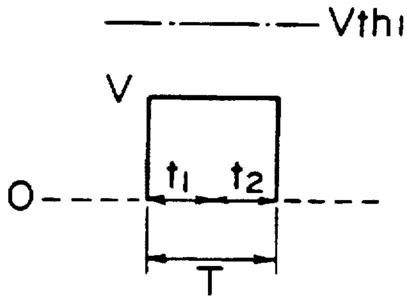
Figure 4B:
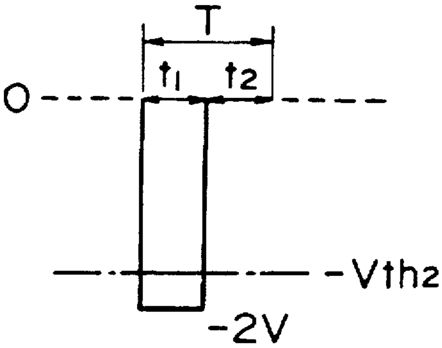
Figure 4B:
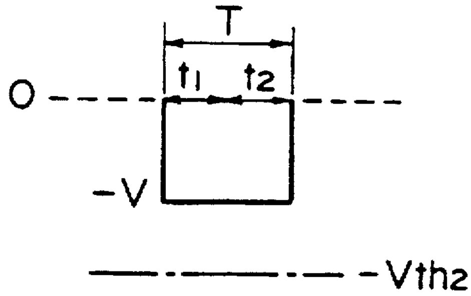
Figure 5A:
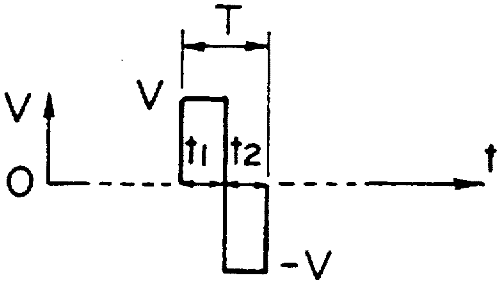
Figure 5C:
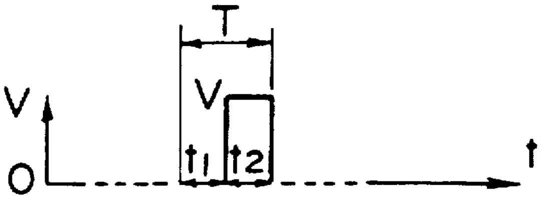
Figure 5B:
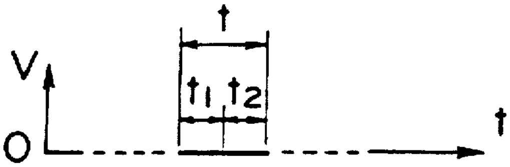
Figure 5D:
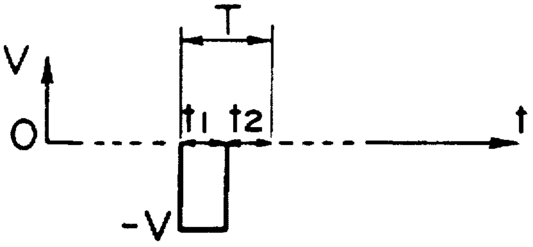
Figure 6A:
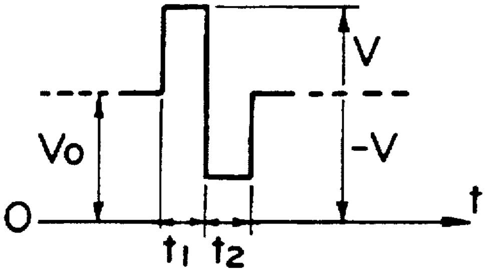
Figure 6C:
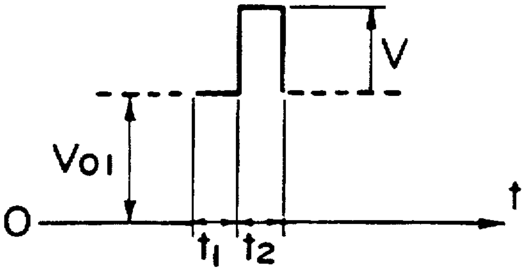
Figure 6B:
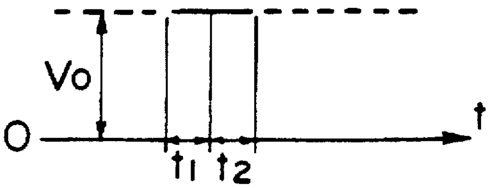
Figure 6D:
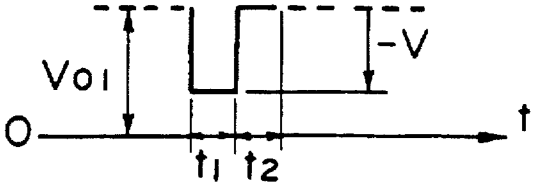

Referring to FIG. 3, there is schematically shown an example of a cell 31 having a matrix electrode arrangement in which a ferroelectric liquid crystal compound is interposed between a pair of groups of electrodes oppositely spaced from each other. Reference numerals 32 and 33 denote a group of scanning electrodes and a group of signal electrodes, respectively. Referring to FIGS. 4A(a) and 4A(b), there are respectively shown electric signals applied to a selected scanning electrode 32(*s*) and electric signals applied to the other scanning electrodes (non-selected scanning electrodes) 32(*n*). On the other hand, FIGS. 4A(c) and 4A(d) show electric signals applied to the selected signal electrode 33(*s*) and electric signals applied to the non-selected signal electrodes 33(*n*), respectively. In FIGS. 4A(a) to 4A(d), the abscissa and the ordinate represent a time and a voltage, respectively. For instance, when displaying a motion picture, the group of scanning electrodes 32 are sequentially and periodically selected. If a threshold voltage for giving a first stable state of the liquid crystal having bistability is referred to as $V_{th1}$ and a threshold voltage for giving a second stable state thereof as $-V_{th2}$, an electric signal applied to the selected scanning electrode 32(*s*) is an alternating voltage showing V at a phase (time) $t_1$ and −V at a phase (time) $t_2$, as shown in FIG. 4A(a). The other scanning electrodes 32(*n*) are placed in earthed condition as shown in FIG. 4A(b). Accordingly, the electric signals appearing thereon show zero volt. On the other hand, an electric signal applied to the selected signal electrode 33(*s*) shows V as indicated in FIG. 4A(c) while an electric signal applied to the non-selected signal electrodes 33(*n*) shows −V as indicated in FIG. 4A(d). In this instance, the voltage V is set a desired value which satisfies $V<V_{th1}<2V$ and $-V>-V_{th2}>-2V$. Voltage waveforms applied to each picture element when such electric signals are given are shown in FIG. 4B. Waveforms shown in FIGS. 4B(a), 4B(b), 4B(c) and 4B(d) correspond to picture elements A, B, C and D shown in FIG. 3, respectively. Namely, as seen from FIG. 4B(a), a voltage of 2 volts above the threshold level $V_{th1}$ is applied to the picture elements A on the selected scanning line at a phase of $t_2$. Further, a voltage of −2 volts above the threshold level $-V_{th2}$ is applied to the picture elements B on the same scanning line at a phase of $t_1$. Accordingly, depending upon whether a signal electrode is selected or not on a selected scanning electrode line, the orientation of liquid crystal molecules changes. Namely, when a certain signal electrode is selected, the liquid crystal molecules are oriented in the first stable state, while when not selected, oriented in the second stable state. In either case, the orientation of the liquid crystal molecules is not related to the previous states of each picture element.

On the other hand, as indicated by the picture elements C and D on the non-selected scanning lines, a voltage applied to all picture elements C and D is +V or −V, each not exceeding the threshold level. Accordingly, the liquid crystal molecules in each of picture elements C and D are placed in the orientations corresponding to signal states produced when they have been last scanned without change in orientation. Namely, when a certain scanning electrode is selected, signals corresponding to one line are written. During a time interval from a time at which writing of signals corresponding to one frame is completed to a time at which a subsequent scanning line is selected, the signal state of each picture element can be maintained. Accordingly, even if the number of scanning lines increases, the duty ratio does not substantially change, resulting in no possibility of lowering in contrast, occurrence of crosstalk, etc. In this instance, the magnitude of the voltage V and length of the phase $(t_1+t_2)=T$ usually ranges from 3 volts to 70 volts and from 0.1 µsec. to 2 msec., respectively, although they change depending upon the thickness of a liquid crystal material or a cell used. The driving method according to the present invention essentially differs from the known prior art driving method in that the method of the present invention makes it easy to allow states of electric signals applied to a selected scanning electrode to change from a first stable state (defined herein as "bright" state when converted to corresponding optical signals) to a second stable state (defined as "dark" state when converted to corresponding optical signals), or vice versa. For this reason, signal applied to a selected scanning electrode alternates between +V and −V. Further, voltages applied to signal electrodes are designed to have reverse polarities to each other in order to designate bright or dark states. It is obvious that in order to effectively operate the driving method according to the present invention, electric signals applied to scanning electrodes or signal electrodes are not necessarily simple rectangular wave signals as explained with reference to FIGS. 4A(a) to 4A(d). For instance, it is possible to drive a liquid crystal using a sine wave, a triangular wave, etc.

Turning to FIG. 5, there is shown another embodiment of a driving method according to the present invention. FIGS. 5(*a*), 5(*b*), 5(*c*) and 5(*d*) show a signal applied to a selected scanning electrode, a signal applied to non-selected scanning electrodes, a selected information signal (with information), and a non-selected information signal (without information), respectively. Thus, as shown in FIG. 5, even if a voltage of +V is applied to a signal electrode with information only during a phase (time) of $t_2$, and a voltage of −V is applied to a signal electrode without information only during a phase (time) of $t_1$, the driving mode shown in FIG. 5 becomes substantially the same as that shown in FIG. 4.

Referring to FIG. 6, there is shown an example given by further modifying the example shown in FIG. 5. FIGS. 6(*a*), 6(*b*), 6(*c*) and 6(*d*) show a signal applied to a selected scanning electrode, a signal applied to non-selected scanning electrodes, a selected information signal (with information), and a non-selected information signal (without information), respectively. In this instance, in order that a liquid crystal device is properly driven based on the present invention, it is required that in driving method shown in FIG. 6 the following relationship is satisfied.

$$V_{01}-V_0-2V<-V_{th}<\left\{\begin{matrix}V_{01}-V_0-V\\V_{01}-V_0\\V_{01}-V_0+V\end{matrix}\right\}<V_{th}<V_{01}-V_0+2V$$

The present invention can also be embodied into a mode of liquid crystal device driving method described as follows. In a method of driving a liquid crystal device having a matrix electrode arrangement comprising a group of scanning electrodes, a group of signal electrodes oppositely spaced from each other, and a liquid crystal showing bistability with respect to an electric field interposed between the group of scanning electrodes and the group of signal electrodes, the mode of driving method is characterized by applying an electric signal having a first phase during which a voltage allowing a liquid crystal having bistability to be oriented to a first stable state is applied between a scanning electrode selected from the group of scanning electrodes and the group of signal electrodes and a second phase during which a voltage allowing the liquid crystal oriented to the first stable state to be oriented to a second stable state is applied between the selected scanning electrode and a signal electrode selected from the group of signal electrodes.

In a preferred embodiment of this driving mode, it is possible to drive a liquid crystal device by giving an electric signal to a selected scanning electrode of the liquid crystal device comprising a group of scanning electrodes sequentially and periodically selected on the basis of scanning signals, a group of signal electrodes oppositely spaced from the group of scanning electrode and selected on the basis of a predetermined information signal, and a liquid crystal interposed therebetween and showing bistability with respect to an electric field, wherein the electric signal has a first phase $t_1$ during which a voltage for producing one direction of electric field is applied, to allow the liquid crystal to be oriented to a first stable state independent of the state of electric signals applied to signal electrodes, and a second phase $t_2$ during which a voltage for assisting the liquid crystal to be reoriented to a second stable state in response to electric signals applied to the signal electrodes is applied.

Figure 7A:
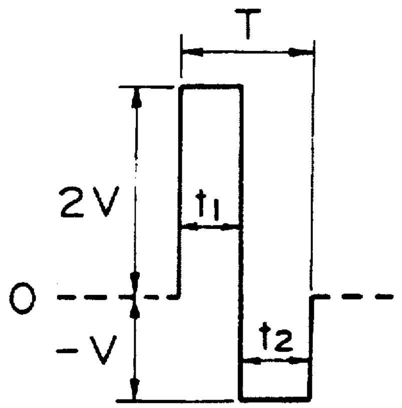
Figure 7A:
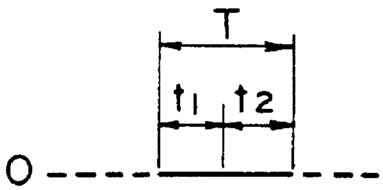
Figure 7A:
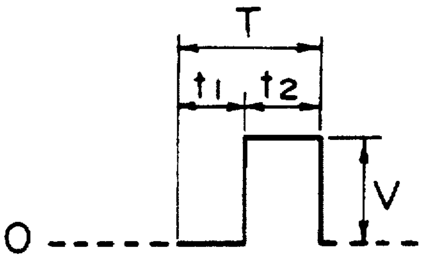
Figure 7A:
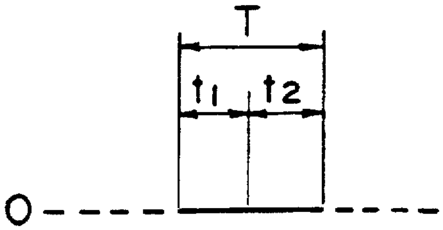
Figure 7B:
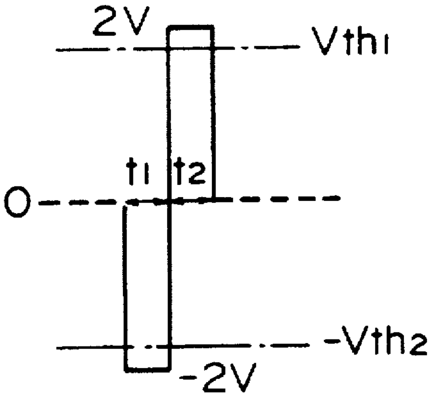
Figure 7B:
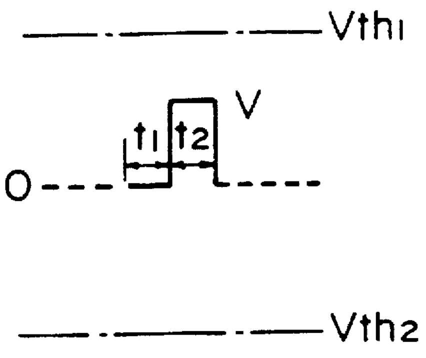
Figure 7B:
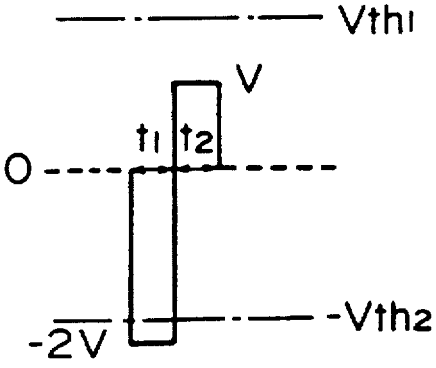
Figure 7B:
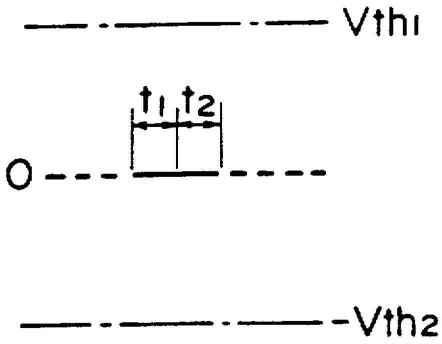

In FIG. 7A(a) to 7A(d), the abscissa and the ordinate represent a time and a voltage, respectively. For instance, when a motion picture is displayed, a desired scanning electrode from the group of scanning electrodes 32 is sequentially and periodically selected. If a threshold voltage above which a first stable state of the liquid crystal cell having bistability is realized is denoted by $V_{th1}$ and a threshold voltage above which a second stable state thereof is realized is denoted by $-V_{th2}$, an electric signal applied to the selected scanning electrode 32(*s*) is an alternating voltage which is 2V at a phase (time) $t_1$ and −V at a phase (time) of $t_2$ as shown in FIG. 7A(a). The other scanning electrodes 32(*n*) are placed in earthed condition as shown in FIG. 7A(b), thus given an electric signal of zero volt. On the other hand, an electric signal applied to each of selected signal electrodes 33(*s*) is zero at a phase $t_1$, and V at a phase $t_2$ as shown in FIG. 7A(c). An electric signal applied to each of non-selected signal electrodes 33(*n*) is zero as shown in FIG. 7A(d). In this instance, the voltage V is set to a desired value so as to satisfy $V<V_{th1}<2V$ and $-V>-V_{th2}>-2V$. FIGS. 7B show voltage waveforms applied to respective picture elements when an electric signal satisfying the above-mentioned relationships is given. The waveforms shown in FIGS. 7B(a), 7B(b), 7B(c) and 7B(d) correspond to the picture elements A, B, C and D shown in FIG. 3, respectively. Namely, as seen from FIG. 7B, since a voltage of −2V above the threshold voltage $-V_{th2}$ at a phase of $t_1$ is applied to all picture elements on a selected scanning line, the liquid crystal molecules are first oriented to one optically stable state (second stable state). Since a voltage of 2V above the threshold voltage $V_{th1}$ is applied to the picture elements A corresponding to the presence of an information signal at a second phase of $t_2$, the picture element A are switched to the other optically stable state (first stable state). Further, since a voltage of V which is not above the threshold voltage $V_{th1}$ is applied to the picture elements B corresponding to the absence of an information signal at the second phase of $t_2$, the picture elements B are kept in the one optically stable state.

On the other hand, on non-selected scanning lines as shown by the picture elements C and D, a voltage applied to all picture elements C and D is +V or zero volt, each being not above the threshold voltage. Accordingly, the liquid crystal molecules in each of picture elements C and D still retains the orientation corresponding to a signal state produced when they have been last scanned. Namely, when a certain scanning electrode is selected, the liquid crystal molecules are first oriented to one optically stable state at a first phase of $t_1$, and then signals corresponding to one line is written thereinto at a second phase of $t_2$. Thus, the signal states can be maintained from a time at which writing of one frame is completed to a time at which a subsequent line is selected. Accordingly, even if the number of scanning electrodes increases, the duty ratio does not substantially change, resulting in no possibility of lowering in contrast, occurrence of crosstalk, etc.

In this instance, the magnitude of the voltage V and the time width of the phase $(t_1+t_2)=T$ usually ranges from 3 volts to 70 volts and from 0.1 μsec. to 2 msec., respectively, although they depend to some extent upon the thickness of a liquid crystal material and a cell used.

In order that the driving method according to the present invention is effectively operated, it is obvious that electric signals applied to scanning electrodes or signal electrodes are not necessarily be simple rectangular wave signals as explained with reference to FIGS. 7A(a) to 7A(d). For instance, it is possible to drive the liquid crystal using a sine wave, triangular wave, etc.

FIGS. 8 show another modified embodiment. The embodiment shown in FIG. 8 differs from the one shown in FIGS. 7 in that the voltage at a phase of $t_1$ in respect of the scanning signal 32(*s*) shown in FIG. 7A(a) is reduced to one half, i.e. V, and in that a voltage of −V is applied to all information signals at a phase of $t_1$. The advantages given by the method employed in this embodiment are that the maximum voltage of signals applied to each electrode can be reduced to one half of that in the embodiment shown in FIGS. 7.

Figure 8A:
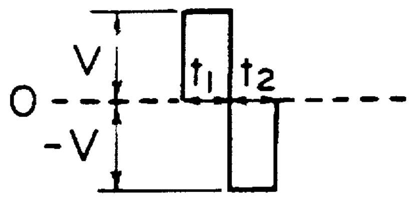
Figure 8A:
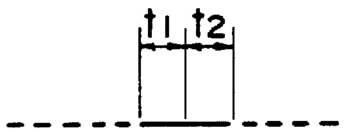
Figure 8A:
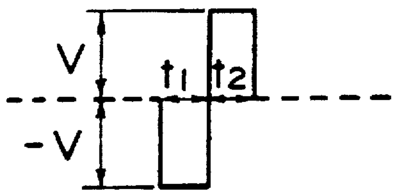
Figure 8A:
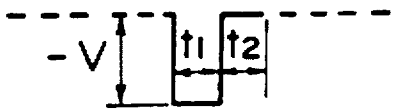
Figure 8B:
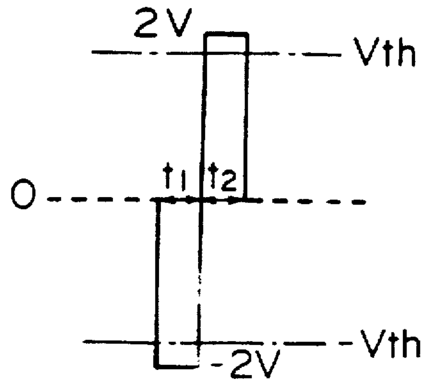
Figure 8B:
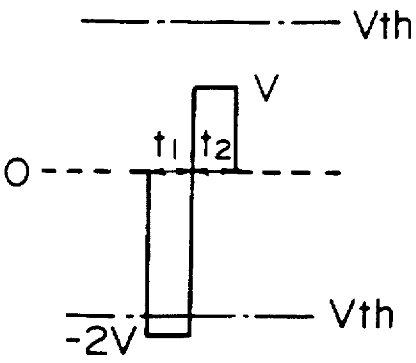
Figure 8B:
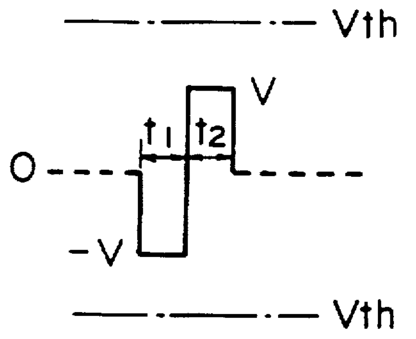
Figure 8B:
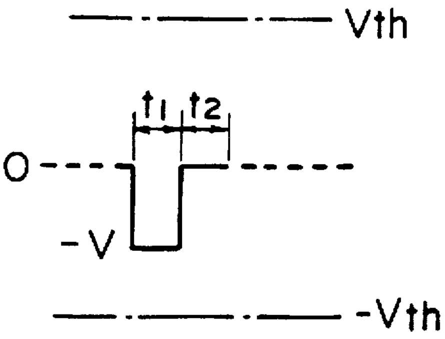
Figure 9A:
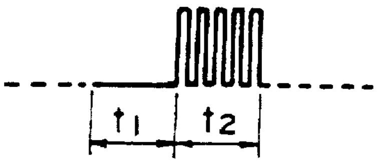
Figure 9B:
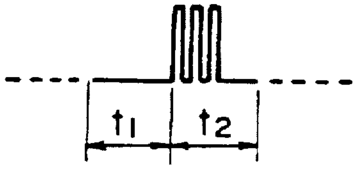
Figure 9C:
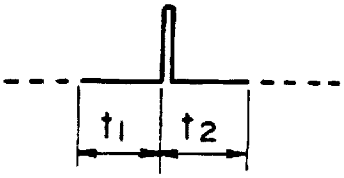
Figure 9D:
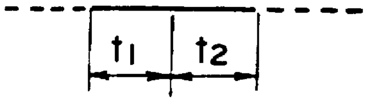

In this instance, FIG. 8A(a) shows a waveform of a voltage applied to the selected scanning electrode 32(*s*). On the other hand, the non-selected scanning electrodes 32(*n*) are placed in earthed condition, as shown in FIG. 8A(b), thus given an electric signal of zero volt. FIG. 8A(c) shows a waveform of a voltage applied to the selected signal electrode 33(*s*). FIG. 8A(d) shows a waveform of a voltage applied to the non-selected signal electrodes 33(*n*). FIGS. 8B show waveforms of voltages respectively applied to the picture elements A, B, C and D. Namely, the waveforms shown in FIGS. 8B(a), 8B(b), 8B(c) and 8B(d) correspond to the picture elements shown in FIG. 3, respectively.

The above explanation of the present invention, has been made on the assumption that a liquid crystal compound layer corresponding to one picture element is uniform, and is oriented to either of two stable states with respect to overall area of one picture element. However, actually the orientation of ferroelectric liquid crystal is quite delicately influenced by interaction between the surfaces of base plates and the liquid crystal molecules. Accordingly, when the difference between an applied voltage and the threshold voltage $V_{th1}$ or $-V_{th2}$ is small, it is possible that stably oriented states in mutually opposite directions are produced in mixture within one picture element due to localized variation of the surface of the base plates. By making use of this phenomenon, it is possible to add a signal for rendering gradation at a second phase of information signal. For instance, it is possible to obtain a gradation image by employing the same scanning signals as those in the driving mode previously stated with reference to FIGS. 7 and by changing the number of pulses at a phase of $t_2$ of the information signal applied to signal electrodes, according to gradation as shown in FIGS. 9(*a*) to 9(*d*).

Further, it is possible to utilize not only variation in the surface condition on a base plate, which is naturally produced during the processing of the base plate, but also surface state on the base plate having a micromosaic pattern which can be artificially produced.

According to another mode of the method of the present invention, in a method of driving an optical modulation device having a matrix electrode array comprising a group of scanning electrodes, a group of signal electrodes oppositely spaced from the group of scanning electrodes, and an optical modulation material showing bistability with respect to an electric field interposed between the group of scanning electrodes and the group of signal electrodes, a voltage $V_{ON1}$ allowing the optical modulation material having bistability to be oriented to a first stable state is applied between a scanning electrode selected from the group of the scanning electrodes and a signal electrode selected from the group of the signal electrodes, a voltage $V_{ON2}$ allowing the optical modulation material having bistability be oriented to a second stable state is applied between the selected scanning electrode and signal electrodes which are not selected from the group of the signal electrodes, and a voltage $V_{OFF}$ having a magnitude set between a threshold voltage $-V_{th2}$ (referring to the second stable state) and a threshold voltage $V_{th1}$ (referring to the first stable state) of the optical modulation device having bistability between non-selected scanning electrodes and the group of signal electrodes, wherein the following relationships are satisfied in regard to voltages $V_{ON1}$, $V_{ON2}$ and $V_{OFF}$;

$$2|V_{OFF}|<|V_{ON1}|,\ |V_{ON2}|$$

A preferred embodiment of this driving mode is suitable for driving a liquid crystal device comprising a group of scanning electrodes sequentially selected based on scanning signals, a group of signal electrodes oppositely spaced from the group of scanning electrodes and selected based on a predetermined information signal, and a liquid crystal showing bistability with respect to an electric field applied thereto, interposed between the group of the scanning electrodes and the group of the signal electrodes. This mode is featured by applying a varying electric signal $V_1(t)$ having phase $t_1$ and $t_2$, of voltages with mutually different polarities (the maximum value is denoted by $V_1(t)$max. and the minimum value by $V_1(t)$min. during the phases) to a selected scanning electrodes, and by applying electric signals $V_2$ and $V_{2a}$ having voltages different from each other to signal electrodes, depending upon whether predetermined information is to be given or not. Thus, an electric field $V_2-V_1(t)$ directed in one direction allowing the liquid crystal to assume a first stable state at a phase of $t_1$ (or $t_2$) in portions on the selected scanning electrode line where information signals are given and an electric field $V_{2a}-V_1(t)$ directed in the opposite direction allowing the liquid crystal to assume a second stable state at a phase of $t_2$ (or $t_1$) in portions on the selected scanning electrode line where information signals are not given wherein the following relationships are satisfied.

$$1<|V_1(t)\text{max.}|/|V_2|$$

$$1<|V_1(t)\text{min.}|/|V_2|$$

$$1<|V_1(t)\text{max.}|/|V_{2a}|$$

$$1<|V_1(t)\text{min.}|/|V_{2a}|$$

According to this preferred embodiment, it is possible to drive the liquid crystal device in a particularly stable manner. The detail of the embodiment will be described with reference to the drawings.

Figure 10A:
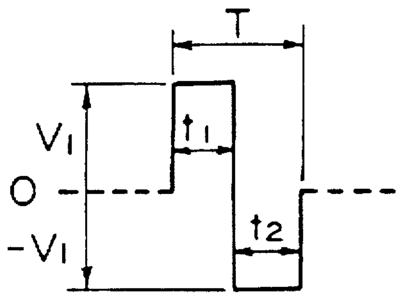
Figure 10A:
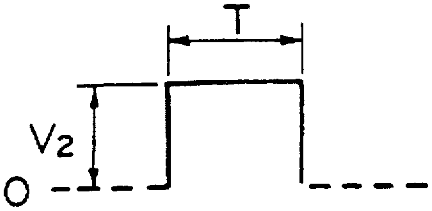
Figure 10A:
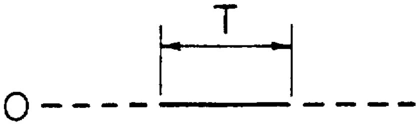
Figure 10A:
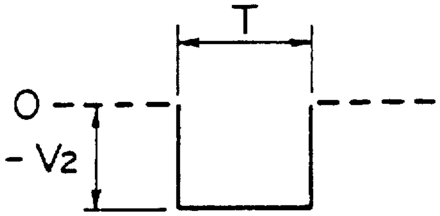

FIGS. 10A(a) and 10A(b) show an electric signal applied to the selected scanning electrode 32(*s*) and that applied to the other scanning electrodes (non-selected scanning electrodes) 32(*n*) shown in FIG. 3, respectively. Likewise, FIGS. 10A(c) and 10A(d) show electric signals applied to the selected signal electrodes 33(*s*) and the non-selected signal electrodes 33(*n*), respectively. In FIGS. 10A(a) to 10A(d), the abscissa and the ordinate represent a time and a voltage, respectively. For instance, when a motion picture is displayed, a scanning electrode is sequentially and periodically selected from the group of scanning electrodes. If a threshold voltage for allowing a liquid crystal having bistability to assume a first stable state is referred to as $V_{th1}$ and a threshold voltage for allowing the liquid crystal to assume a second stable state as $-V_{th2}$, an electric signal applied to the selected scanning electrode 32(*s*) is an alternating voltage showing $V_1$ and $-V_1$ at phase (times) of $t_1$ and $t_2$, respectively, as shown in FIG. 10A(a). Application of an electric signal having a plurality of phase intervals of which voltages are different from each other to the selected scanning electrode results in a very important advantage that the transition between first and second stable states respectively corresponding to an optically "bright" condition and an optically "dark" condition can be caused at a high speed.

On the other hand, the other scanning electrodes 32(*n*) are placed in earthed condition as shown in FIGS. 10A(b), thus zero volt. An electric signal $V_2$ is applied to the selected signal electrodes 33(*s*) as shown in FIG. 10A(c), while an electric signal $-V_2$ is applied to the non-selected signal electrodes 33(*n*) as shown in FIG. 10A(d). In this instance, the respective voltages are set to a desired value so as to satisfy the following relationships;

$$V_2,\ (V_1-V_2)<V_{th1}<V_1+V_2,\ -(V_1+V_2)<-V_{th2}<-V_2,\ -(V_1-V_2).$$

Figure 10B:
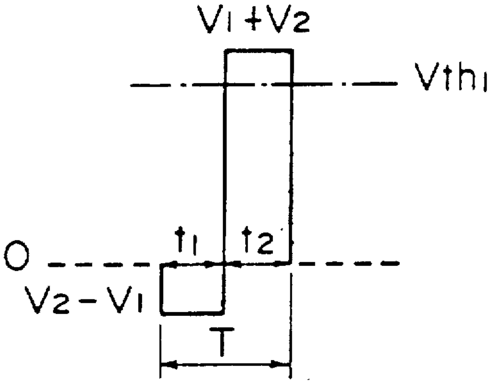
Figure 10B:
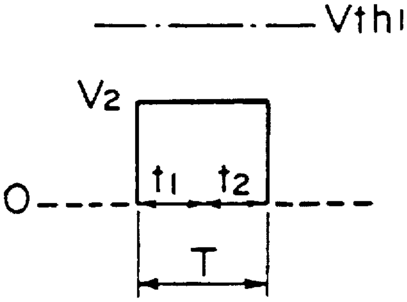
Figure 10B:
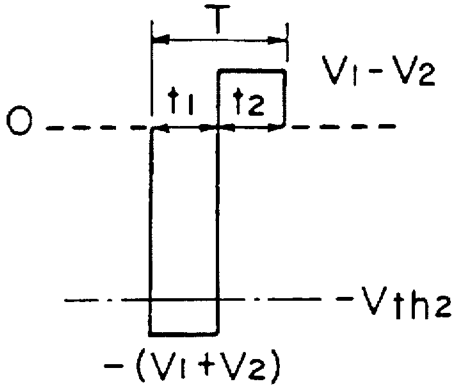
Figure 10B:
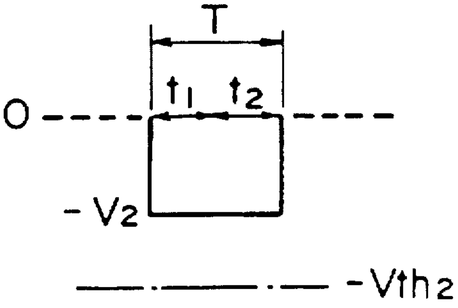

Voltage waveforms applied to picture elements, i.e. the picture elements A, B, C and D shown in FIG. 3 are shown in FIGS. 10B(a) to 10B(d), respectively. As seen from FIGS. 10B(a) to 10B(d), a voltage of $V_1+V_2$ above the threshold voltage is applied to the picture element A on a selected scanning line at a phase of $t_2$. A voltage of $-(V_1+V_2)$ above the threshold voltage $-V_{th2}$ is applied to the picture element B on the same scanning line at a phase of $t_1$. Accordingly, on the selected scanning electrode line, the liquid crystal molecules can be oriented to different stable states depending upon whether a signal electrode is selected or not. Namely, when the signal electrode is selected, the liquid crystal molecules are oriented to a first stable state. On the other hand, when not selected, they are oriented to a second stable state. In either case, the orientation is not related to the previous states of each picture element.

On the other hand, voltages applied to the picture elements C and D are shown in FIGS. 10B(c) and 10B(d), respectively. Voltages applied to all picture elements C and D are $V_2$ or $-V_2$ on the non-selected scanning lines, each being not above the threshold voltage. Accordingly, the liquid crystal molecules in each of the picture elements C and D maintains an orientation corresponding to signal state produced when the elements are lastly scanned. Thus, when a scanning electrode is selected, and signals corresponding to one line are written thereinto, and, the signal state thus obtained can be maintained during a time interval from a time at which the writing of the one frame is completed to a time at which the scanning electrode is selected. Accordingly, even if the number of scanning electrodes increases, the duty ratio does not substantially change, resulting in no possibility of lowering in contrast. In this instance, the magnitude of $V_1$ and $V_2$ and the time width of the phase $(t_1+t_2)=T$ usually range from 3 volts to 70 volts and from 0.1 μsec. to 2 msec., respectively, although they somewhat depend upon the thickness of a liquid crystal material and a cell used. The important character of this mode a voltage signal alternating, e.g. from $+V_1$ to $-V_1$ is applied to a selected scanning electrode in order to make it easy for an electric signal applied to a selected scanning electrode to change from a first stable state (assumed as "bright" state when the electric signal is converted to an optical signal) to a second stable state (assumed as "dark" state when converted to an optical signal) or vice versa. Further, voltages applied to signal electrodes are made different from each other for the purpose of designating "bright" or "dark" state.

In the above-mentioned description, the bistability the behavior of a ferroelectric liquid crystal and the driving method therefor have been explained based on somewhat ideal states. For instance, although a liquid crystal having bistability is used, actually it cannot remain in one stable state for an infinitely long time under no application of an electric field. Explaining in more detail, when a layer of a ferroelectric liquid crystal DOBAMBC having a thickness larger than about 3 μm is used, at first there partially remains a helical structure in the SmC*-phase. When an electric field directed in one direction (e.g. +30V/3 μm) is applied thereto in the direction of the layer thickness, the helical structure is completely loosened. Thus, the liquid crystal molecules are converted into a state of being uniformly oriented along the surface thereof. Then, if the liquid crystal molecules are returned to a state where there is no application of electric field, they gradually and partially return to the helical structure.

Accordingly, when transmitted lights are observed with the liquid crystal cell being interposed between a pair of upper and lower polarizers disposed in a cross nicol relationship, i.e. their polarizing surfaces being substantially perpendicular to or crossing each other, it is seen that contrast of the display gradually lowers. The speed at which the stable state oriented in one direction is relaxed strongly depends upon surface states (e.g. surface material, surface processing, etc.) of a pair of base plates between which a liquid crystal material is interposed. In the above-mentioned embodiments, it has been described that threshold voltages $V_{th1}$ and $V_{th2}$ required for allowing the liquid crystal molecules to be switched to one stable state are determined at constant values. However, in fact, these threshold voltages strongly depend upon factors, e.g. surface state of a base plate, etc., resulting in large variations with respect to each cell. Further, the threshold voltage also depends upon a voltage application time. For this reason, according as the voltage applied time is long, there is a tendency that the threshold voltage lowers. Accordingly, there occurs a switching between two stable states of the liquid crystal even on a non-selected line or lines when signals show a certain form, resulting in possibility that there occurs a crosstalk.

Based on the above-mentioned analysis and consideration, when an optical modulation device is intended to be stably prepared and driven, it is preferable to set the voltages $V_{ON1}$ and $V_{ON2}$ for causing liquid crystal molecules to be oriented on a elected point or points to a first and a second table states, respectively, and the voltage $V_{OFF}$ applied to non-selected points so that the differences between their magnitudes and the average threshold voltages $V_{th1}$ and $V_{th2}$ are as large as possible. When fluctuations in characteristics between devices and those in a size device are taken into account, it is confirmed preferable in view of stability that $|V_{ON1}|$ and $|V_{ON2}|$ are twice as large as $|V_{OFF}|$ or larger. In order to realize such conditions for applying voltages with the driving method explained with reference to FIGS. 10 showing the embodiment allowing quick transition between two stable states at, it is preferable to set a voltage $|V_1-V_2|$ at a phase of $t_2$ (FIG. 10B(a)) applied to picture elements corresponding to the absence of information by a selected scanning electrode and a non-selected signal electrode to be sufficiently remote from $V_{ON1}$, particularly less than 1/1.2 of $V_{ON1}$. Accordingly, following the example shown in FIG. 10, the condition therefor is as follows.

$$1<|V_1(t)|/|V_2|<10$$

Further, referring to this condition in a generalized manner, it is not required that a voltage applied to each picture element and an electric signal applied to each electrode is symmetry or has a step-like or rectangular shape. In order to generally express the above-mentioned condition so as to include such cases, it is assumed that the maximum value of an electric signal (voltage with respect to earth potential) applied to scanning electrodes within the chase of $t_1+t_2$ is $V_1(t)$max., the minimum value thereof is $V_1(t)$min., an electric signal (relative voltage with respect to earth potential) corresponding to a state with information, applied to a selected signal electrode is $V_2$, and an electric signal (relative voltage) corresponding to a state with no information, applied to non-selected signal electrodes is $V_{2a}$. It is preferable to satisfy the following conditions for the purpose of driving the liquid crystal in a stable manner.

$$1<|V_1(t)\text{max.}|/|V_2|<10$$

$$1<|V_1(t)\text{min.}|/|V_2|<10$$

$$1<|V_1(t)\text{max.}|/|V_{2a}|<10$$

$$1<|V_1(t)\text{min.}|/|V_{2a}|<10$$

Figure 11:
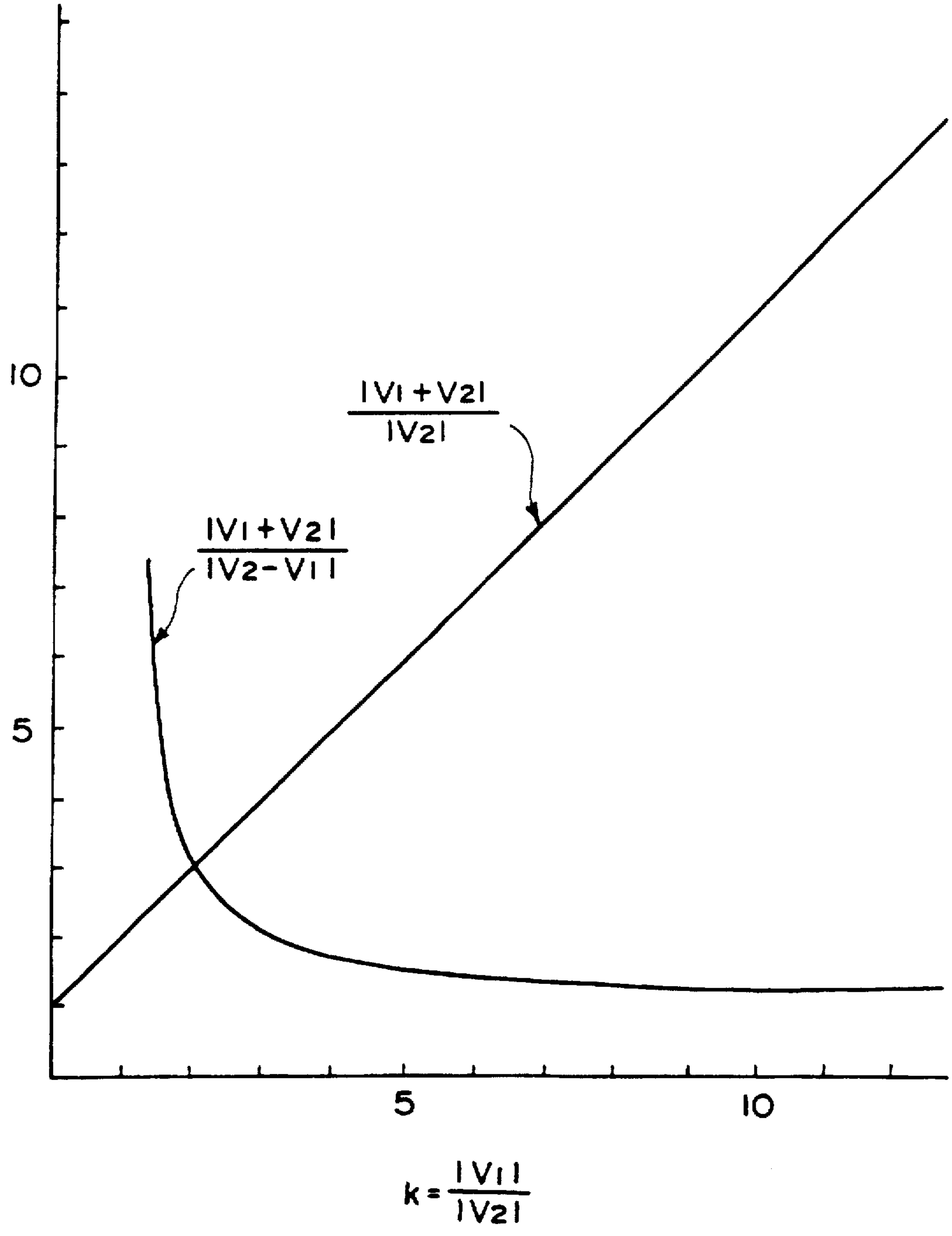
FIG. 11 is a graph showing how drive stability varies depending upon k which is an absolute value of a ratio of an electric signal $V_1$ applied to scanning electrodes and electric signals $\pm V_2$ applied to signal electrodes, FIG. 12A(a) shows a waveform of an electric signal applied to a selected scanning electrode, FIG. 12A(b) shows a waveform of an electric signal applied to non-selected scanning electrodes, FIG. 12A(c) shows a waveform of an information signal applied to a selected signal electrode, FIG. 12A(d) shows a waveform of an information signal applied to non-selected signal electrodes, FIG. 12B(a) shows a waveform of a voltage applied to a liquid crystal corresponding to a picture element A, FIG. 12B(b) shows a waveform of a voltage applied to a liquid crystal corresponding to a picture element B, FIG. 12B(c) shows a waveform of a voltage applied to a liquid crystal corresponding to a picture element C, FIG. 12B(d) shows a waveform of a voltage applied to a liquid crystal corresponding to a picture element D.

In FIG. 11 the abscissa represents a ratio k of an electric signal $V_1$ applied to scanning electrodes to an electric signal $\pm V_2$ applied to signal electrodes varies on the basis of the embodiment explained with reference to FIG. 10. More particularly, the graph of FIG. 11 shows the variation of the ratio of a maximum voltage $|V_1+V_2|$ applied to a selected point (between a selected signal electrode and selected or non-selected scanning electrode), a voltage $|V_2|$ applied to a non-selected point (between a non-selected signal electrode and a selected or non-selected scanning electrode), and a voltage $|V_2-V_1|$ applied at a phase of $t_1$ shown in FIG. 10B(a) (or at a phase of $t_2$ shown in FIG. 10B(b)) (each is expressed by an absolute value). As understood from this graph, it is preferable that the ratio $K=|V_1/V_2|$ is larger than 1, particularly lines between a range expressed by an inequality $1<k<10$.

In order to effectively perform this mode of the driving method according to the present invention, it is obvious that it is not necessarily required that an electric signal applied to scanning electrodes and signal electrodes is a simple rectangular wave. For instance, as long as effective time interval is given, it is possible to drive the liquid crystal device using a sine wave or a triangular wave.

According to a mode of the driving method of the present invention, it is possible to rewrite a part of a image area in which an image has been previously written, with a different image. More particularly, in a method of driving an optical modulation device (e.g. a liquid crystal device) having an electrode arrangement comprising a group of scanning electrodes, a group of signal electrodes for providing desired information signals, and an optical modulation material (e.g. a liquid crystal) showing bistable property with respect to an electric field between the groups of scanning and signal electrodes, this mode of invention is characterized by applying a voltage allowing the optical modulation material having the bistability to be oriented to a first stable state (one optically stable state) between a scanning electrode selected from the group of scanning electrodes and a signal electrode or electrodes selected from signal electrodes to which new image information is given among the group of signal electrodes, applying a voltage allowing the optical modulation material having the bistability to be oriented to a second stable state (the other optically stable state) between the selected scanning electrode and a signal electrode which is not selected from signal electrodes to which new image information is given among the group of signal electrodes, and applying a voltage set to a value between a threshold voltage $-V_{th2}$ (for the second stable state) and a threshold voltage $V_{th1}$ (for the first stable state) of the optical modulation material having the bistability between scanning electrodes which are not selected from the group of scanning electrodes and the group of the signal electrodes and between all the signal electrodes and signal electrodes to which new image information is not given.

In a preferred embodiment of this mode, there is provided a liquid crystal device at least comprising a group of scanning electrodes sequentially selected based on scanning signals, a group of signal electrodes oppositely spaced from the group of scanning electrodes and selected based on desired information signals, and a liquid crystal interposed between the both electrode groups and showing bistability with respect to an electric field, and an electric signal having phases $t_1$ and $t_2$, voltages corresponding thereto being different from each other, is applied to a selected scanning electrode, and electric signals of different voltages depending upon whether there is a predetermined information or not, or whether the information lastly scanned is maintained without change or not. Thus, it is possible to drive the liquid crystal device by applying an electric field directed in one direction which provides a first stable state at a phase of $t_1$ ($t_2$) to an area in which there is an information signal on the selected scanning electrode line, by applying an electric field directed in the opposite direction which provides a second stable state at a phase of $t_2$ ($t_1$) to an area in which there is not an information signal and by applying an electric field less than an electric field threshold level and switching the liquid crystal molecules from one stable state to the other at phase $t_1$ and $t_2$ to an area in which the information lastly scanned should be maintained.

Figure 12A:
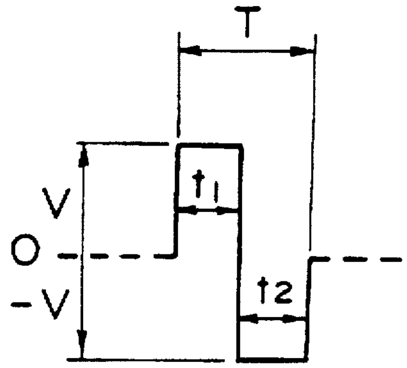
FIG. 12C is an explanatory view illustrating an example of an image created by a liquid crystal device after one frame scanning is completed, FIG. 12D(a) is an explanatory view showing an example of an image wherein the image shown in FIG. 12C is partially changed by writing, FIG. 12D(b) shows a waveform of an information signal applied to a signal electrode to which new image information is not to be provided when the image is partially rewritten, FIGS. 12D(c) and 12D(d) are waveforms showing a voltage applied to a liquid crystal between a signal electrode to which new image information is not to be provided when the image is partially rewritten and a selected scanning electrode, and between the signal electrode and non-selected scanning electrodes, respectively, FIG. 13(*a*) shows a waveform of a signal applied to a selected scanning electrode in a still further embodiment, FIG. 13(*b*) shows a waveform of a signal applied to non-selected scanning electrodes in the still further embodiment, FIGS. 13(*c*) and 13(*d*) are waveforms showing information signals applied to a selected signal electrodes and non-selected electrodes, respectively, among signal electrodes which are to be provided with new image information.
Figure 12A:
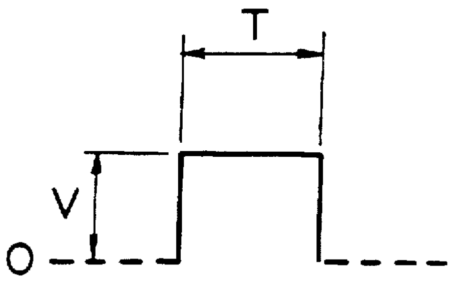
Figure 12A:
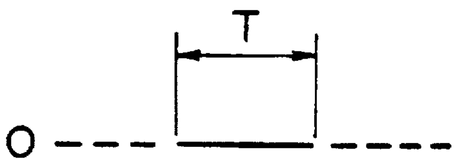
Figure 12A:
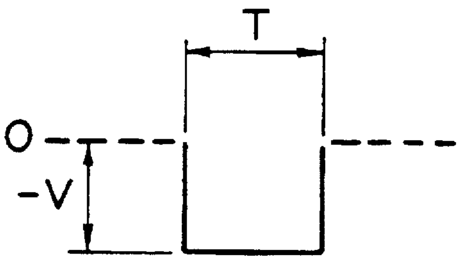

A preferred embodiment of this driving mode will be described with reference to FIGS. 12A to 12D. FIGS. 12A(a) and 12A(b) show electric signals applied to the selected scanning electrode 32(*s*) and those applied to the other scanning electrodes (non-selected scanning electrodes), respectively. FIGS. 12A(c) and 3A(d) show electric signals applied to the selected signal electrodes 33(*s*) and those applied to the non-selected signal electrodes 33(*n*), respectively. In FIGS. 12A(a) to 12A(d), the abscissa and the ordinate represent a time and a voltage, respectively. For instance, when a motion picture is displayed, a scanning electrode is sequentially and periodically selected from the group of scanning electrodes. If a threshold voltage for providing a first stable state is $V_{th1}$ of a liquid crystal cell showing bistability, and a threshold voltage for providing a second stable state thereof is $-V_{th2}$, an electric signal applied to the selected scanning electrode 32(*s*) is an alternating voltage which becomes V at a phase (time) of $t_1$ and −V at a phase (time) of $t_2$, as indicated by FIG. 12A(a). When an electric signal having a plurality of phases of different voltages is applied to the selected scanning electrode, an important advantage is attained that two stable states of the liquid crystal for determining display conditions of the device can be easily switched at a high speed.

Figure 12B:
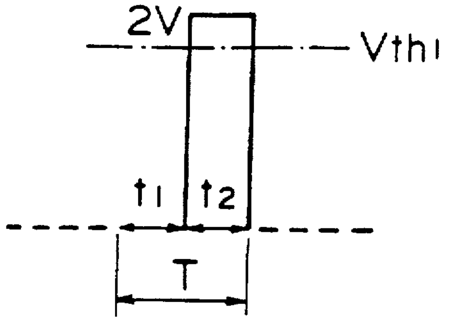
Figure 12B:
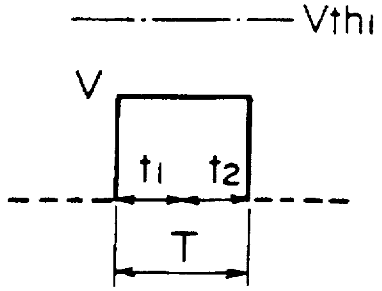
Figure 12B:
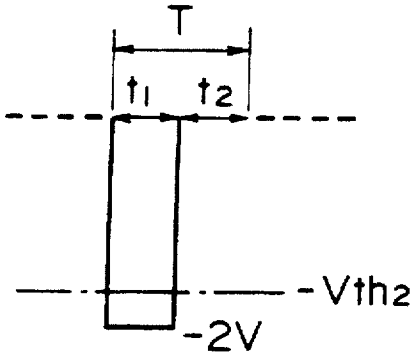
Figure 12B:
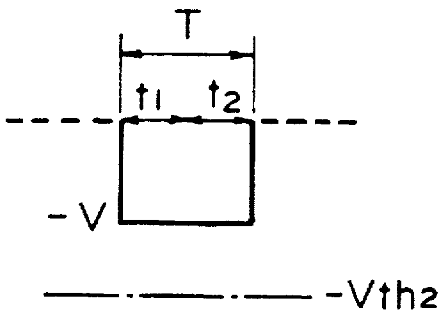

On the other hand, the other scanning electrodes 32(*n*) are placed in the earthed condition as shown in FIG. 12A(b), thus at zero volt. An electric signal applied to the selected signal electrodes 33(*s*) is V as shown in FIG. 12A(c), and an electric signal applied to the non-selected signal electrodes 33(*n*) is −V as shown in FIG. 12A(d). In this instance, the voltage V is set to a desired value satisfying the relationships expressed by $V<V_{th1}<2V$ and $-V>-V_{th2}>-2V$. Voltage waveforms applied to respective picture element, i.e. the picture elements A, B, C and D shown in FIG. 3 when such electric signals are given, are shown in FIGS. 12B(a), 12B(b), 12B(c) and 12B(d), respectively. As seen from FIGS. 12B(a) to 12B(d), a voltage of 2V higher than the threshold voltage $V_{th1}$ is applied to the picture element A on the selected scanning line at a phase of $t_2$, while a voltage of −2V higher than the threshold level $-V_{th2}$ is applied to the picture element B on the same scanning line at a phase of $t_1$. Accordingly, the orientation of the liquid crystal is determined depending upon whether the signal electrode is selected or not on the selected scanning electrode line. Namely, when selected, the liquid crystal molecules are oriented to the first stable state. When not selected, they are oriented to the second stable state. In either case, the orientation is not related to the previous states of each picture element.

Figure 12C:
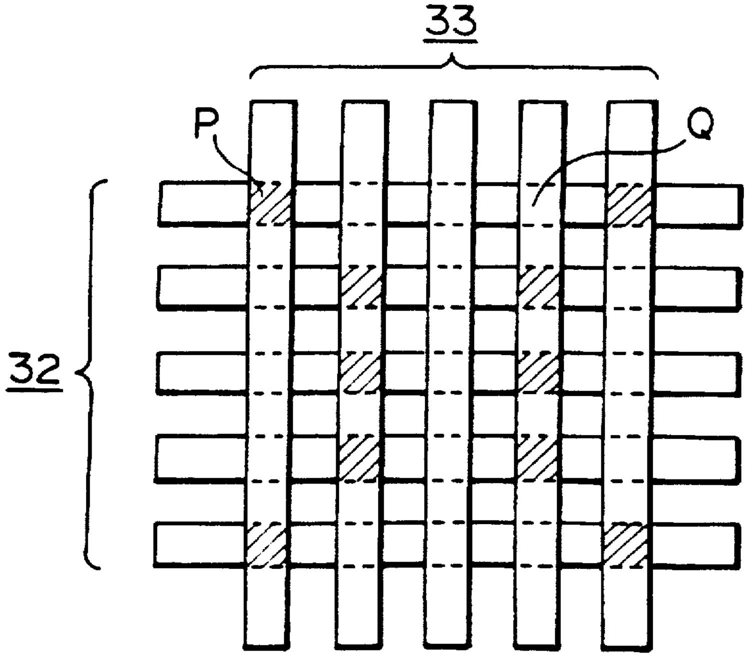
Figure 12D:
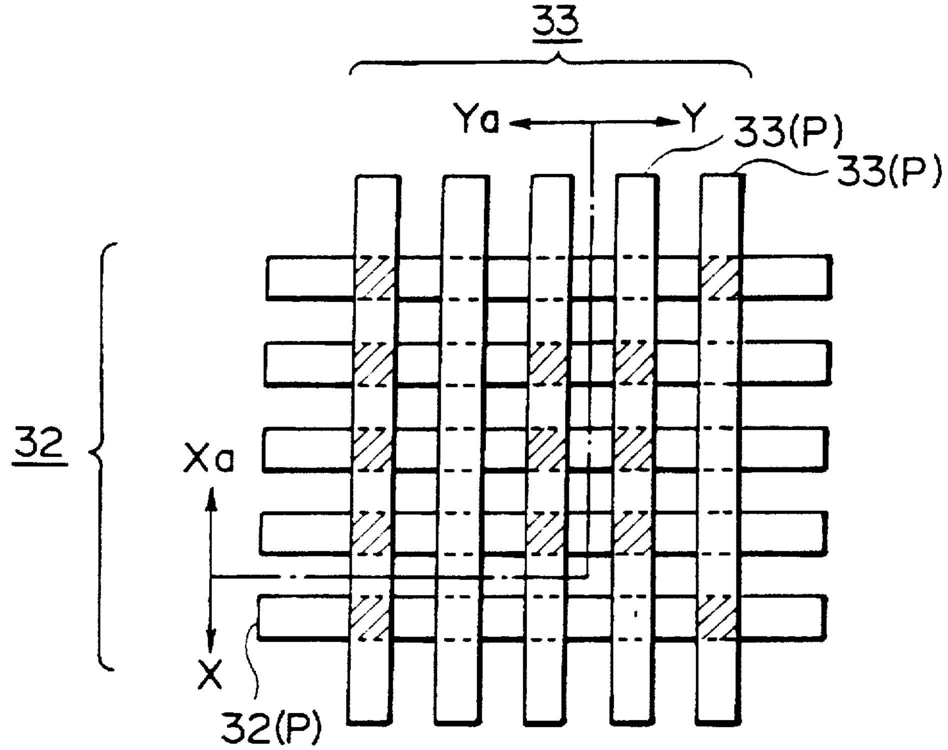
Figure 12D:
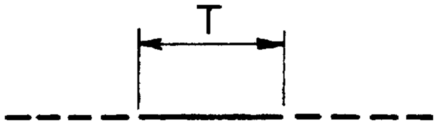
Figure 12D:
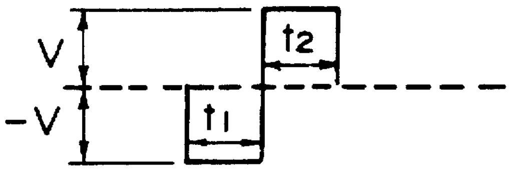
Figure 12D:
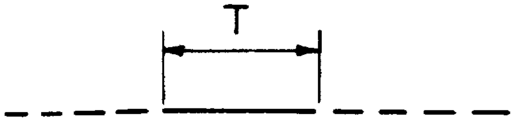
Figure 13A:
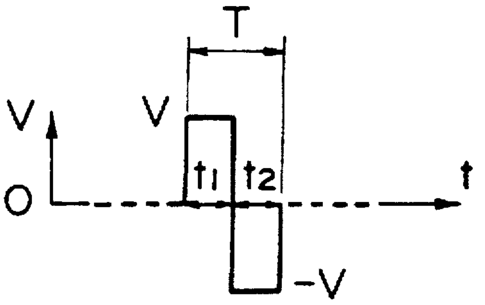
FIG. 13(e) shows a waveform of a signal applied to a signal electrode which are not to be provided with new image information, FIG. 14(*a*) shows a waveform of a signal applied to a selected scanning electrode in a further embodiment, FIG. 14(*b*) shows a waveform of a signal applied to non-selected scanning electrodes in the further embodiment, FIGS. 14(*c*) and 14(*d*) are waveforms showing an information signals applied to a selected signal electrode and non-selected electrodes, respectively, among signal electrodes which are to be provided with new image information in the further embodiment.
Figure 13C:
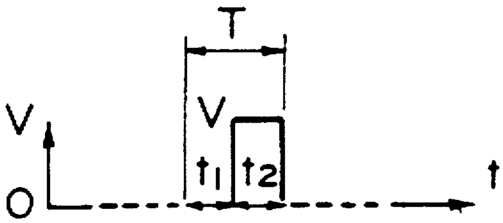
Figure 13B:
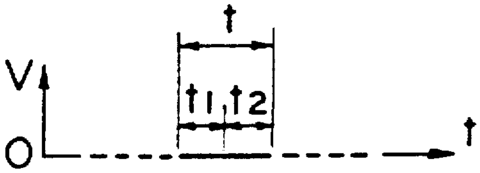
Figure 13D:
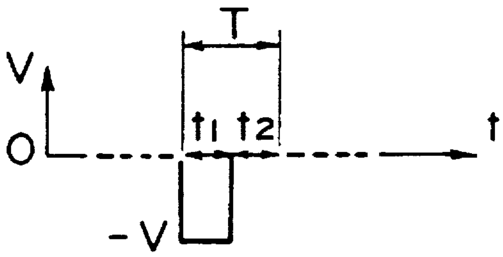
Figure 13E:
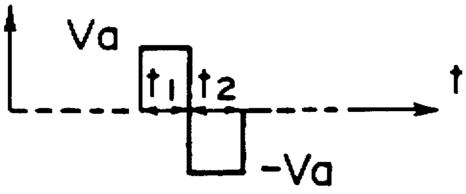
Figure 14A:
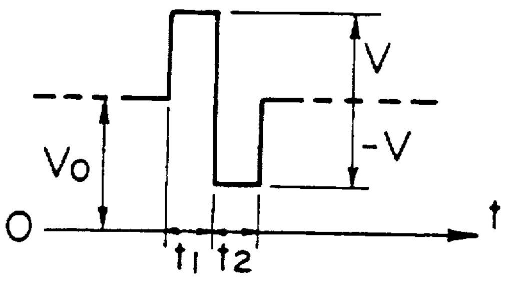
FIG. 14(e) shows a waveform of a signal applied to a signal electrode which are not to be provided with new image information.
Figure 14C:
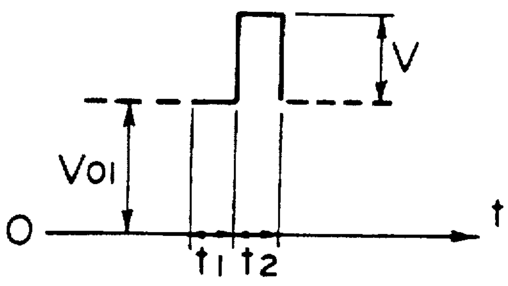
Figure 14B:
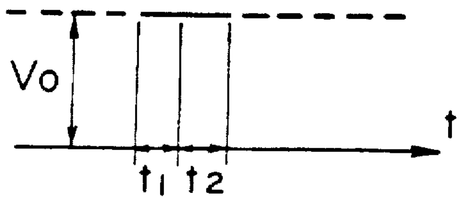
Figure 14D:
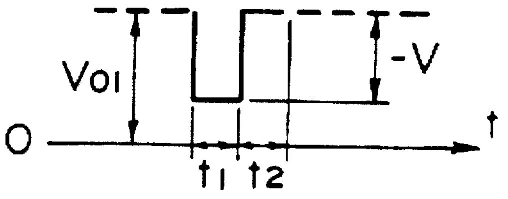
Figure 14E:
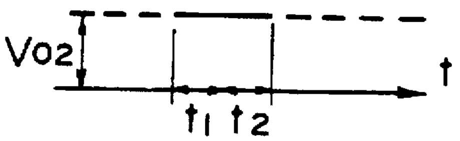

On the other hand, a voltage applied to the picture elements C and D is +V or −V on the non-selected scanning lines. Accordingly, the liquid crystal molecules in respective picture elements C and D are still placed in the orientation corresponding to signal states produced when last scanned. Namely, when a scanning electrode is selected, signals corresponding to one line are written and the signal states can be maintained during a time interval from a time at which the writing of the one frame is completed to a time at which the scanning electrode is selected. Accordingly, even if the number of scanning electrodes increases, the duty-ratio does not substantially change, resulting in no possibility of lowering in contrast nor occurrence of crosstalk. In this instance, the magnitude of the voltage V and a time width of the phase of $(t_1+t_2)=T$ usually range from 3 volts to 70 volts and from 0.1 μsec. to 2 msec., although they somewhat depends upon the thickness of a liquid crystal material or a cell used. This driving mode according to the present invention essentially differs from the prior art method in that it makes easy to cause the transition from a first stable state (assumed as "bright" state when the electric signal is changed to an optical signal) to a second stable state (assumed as "dark" condition when changed to an optical signal), or vice versa. For this purpose, an electric signal applied to the selected scanning electrode alternates from +V to −V. Further, voltages applied to the signal electrodes are different from each other in order to designate "bright" or "dark" state. An example of image when the scanning of one line is thus finished is shown in FIG. 12C. In the figure a dashed section P represents a "bright" state and brank section Q a "dark" state). Then, for instance, an example when an image is partially rewritten is shown in FIG. 12D(a). As shown in figure, when an attempt is made to rewrite only area defined by the group of scanning electrodes Xa and the group of signal electrodes Ya, scanning signals are sequentially applied only to the area Xa. Further an information signal which changes depending upon whether there is an information or not is applied to the area Ya. A signal (in this instance, 0 volt) as shown in FIG. 12D(b) is applied to the group of scanning electrodes giving an area where information written when lastly scanned is maintained (i.e. new information is not given). Accordingly, when the group of scanning electrodes Xa are scanned, a voltage applied to respective picture elements at signal electrodes Y changes as shown in FIG. 12D(c), while when not scanned, the voltage becomes as shown in FIG. 12D(d). In either case, the voltage is not above the threshold voltage. As a result, the image obtained when last scanned is reserved as it is.

In order to effectively perform the driving mode according to the present invention, it is obvious that it is not necessarily required that an electric signal supplied to scanning electrodes and signal electrodes is a simple rectangular wave signal as explained with reference to FIGS. 12A(a) to 12A(d) and FIGS. 12D(b) to 12D(d). For instance, as long as an effective time period is given, it is possible to drive the liquid crystal using a sine wave or a rectangular wave.

Referring to FIG. 13, there is shown another embodiment of the driving mode according to the present invention. More particularly, a signal on a selected scanning electrode is shown in FIG. 13(*a*), a signal on a non-selected scanning electrode is shown in FIG. 13(*b*), a selected information signal (corresponding to the presence of information) is shown in FIG. 13(*c*), a non-selected (corresponding to the absence of information) is shown in FIG. 13(*d*), and an information signal which maintains a signal when last scanned is shown in FIG. 13(*e*).

The value of Va shown in FIG. 13(*e*) is set so as to satisfy the following relationship.

$$|Va-V|<|V_{th1}|, |V_{th2}|$$

$$|Va|<|V_{th1}|, |V_{th2}|$$

Referring to FIG. 14, there is shown a further embodiment of the invention. Similar to FIG. 13, a signal on a selected scanning electrode is shown in FIG. 14(*a*), a signal on non-selected scanning electrodes is shown in FIG. 14(*b*), a selected information signal corresponding to presence of information) is shown in FIG. 14(*c*), a non-selected information signal (corresponding to the absence of information) is shown in FIG. 14(*d*), and an information signal for maintaining a signal obtained when last scanned is shown in FIG. 14(*e*). In order that the liquid crystal device is properly driven in accordance with the present invention, following relationships are required to be satisfied in the driving mode as shown in FIG. 14:

$$\begin{pmatrix} |V_{02}-(V_0+V)| \\ |V_{02}-(V_0-V)| \\ |V_{02}-V_0| \end{pmatrix} < \begin{pmatrix} |V_{th1}| \\ |V_{th2}| \end{pmatrix}$$

$$(V_{01}-V_0-2V) < -V_{th2} <$$

$$\begin{pmatrix} (V_{01}-V_0-V) \\ (V_{01}-V_0) \\ (V_{01}-V_0+V) \end{pmatrix} <$$

$$V_{th1} < (V_{01}-V_0+2V)$$

Another driving mode according to the invention can be used to drive an optical modulation device comprising a matrix electrode arrangement comprising a group of scanning electrodes and a group of signal electrodes oppositely spaced from the group of scanning electrodes wherein scanning signals are selectively applied sequentially and periodically to the group of scanning electrodes, and an information signal is applied to the group of signal electrodes in synchronism with the scanning signals, thereby to effect optical modulation of an optical modulation material showing bistability with respect to an electric field between the group of scanning electrodes and the group of signal electrodes. In this mode of driving method, after an information signal is applied to the group of the signal electrodes in synchronism with a scanning signal applied to a scanning electrode selected from the group of scanning electrodes, and before a subsequent information signal is selectively applied to the group of signal electrodes in synchronism with scanning signals applied to the scanning electrodes subsequently selected, there is provided an auxiliary signal applying period for applying a signal different from the information signal selectively applied to the group of signal electrodes.

The detailed embodiment of this driving method will be explained with reference to FIGS. 15 to 17.

Figure 15:
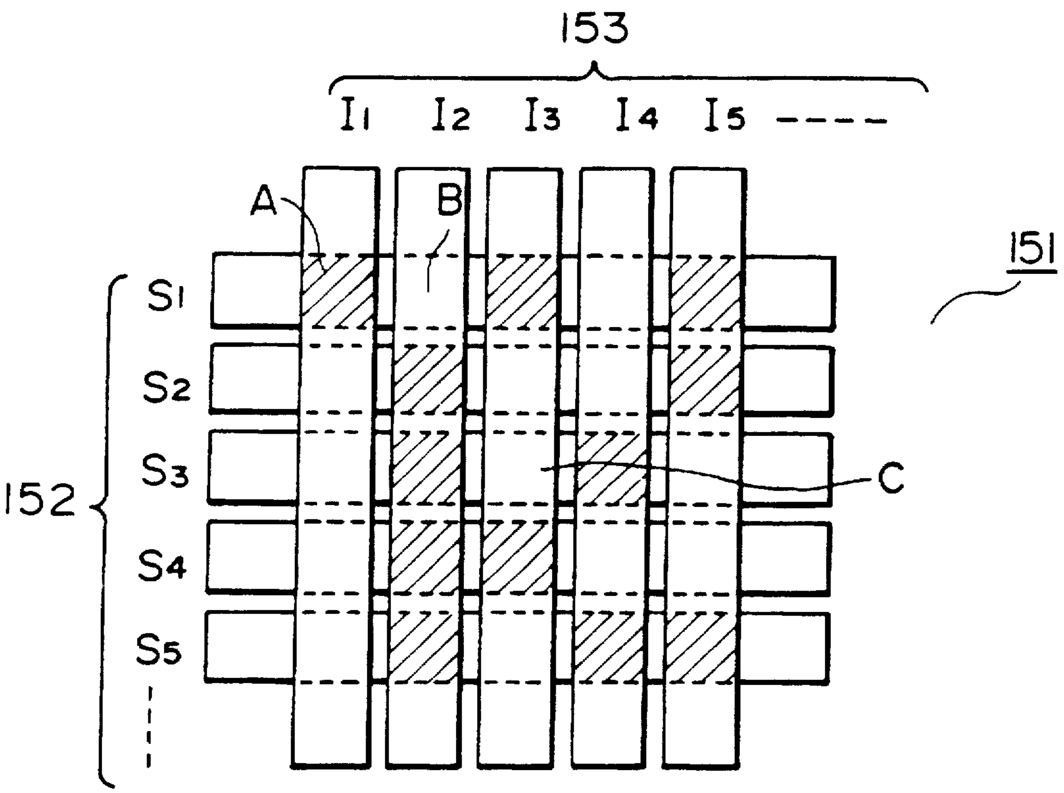
FIG. 15 is a plan view illustrating matrix electrodes used in a driving method according to the present invention, FIGS. 16(*a*) to 16(*d*) are explanatory views each showing an electric signal applied to the matrix electrodes, FIGS. 17(*a*) to 17(*d*) are explanatory views showing a waveform of a voltage applied between the matrix electrodes, FIG. 18(*a*) shows a time chart based on a driving method having no time period for applying an auxiliary signal, FIGS. 18(*b*), 20 and 22 show time charts used in a driving method according to the present invention.
Figure 16A:
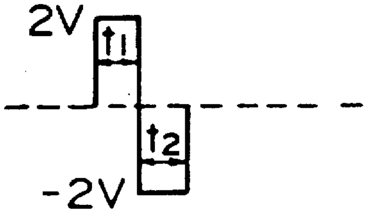
Figure 16C:
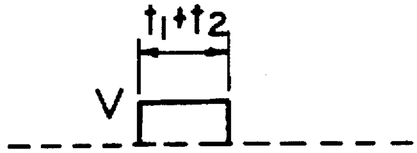
Figure 16B:
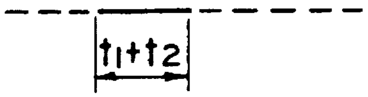
Figure 16D:
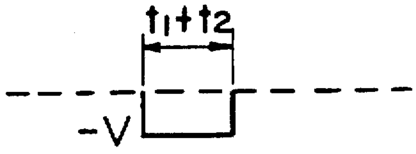
Figure 17A:
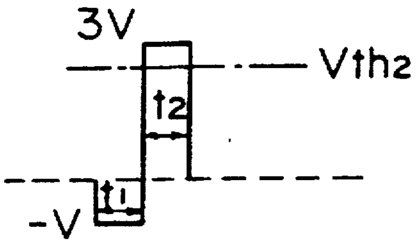
Figure 17C:
Figure 17B:
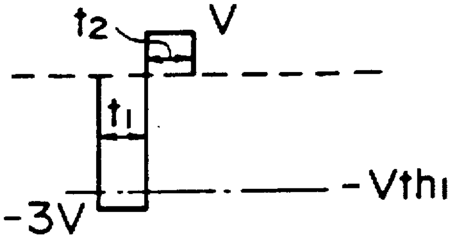
Figure 17D:

FIG. 15 shows a schematic view illustrating a cell 151 having a matrix electrode arrangement between which a ferroelectric liquid crystal compound (not shown) is interposed. In the figure, reference numerals 152 and 153 denote a group of scanning electrodes and a group of signal electrodes, respectively. First, the case that a scanning electrode $S_1$ is selected will be described. FIG. 16(*a*) shows a scanning electric signal applied to a selected scanning electrode $S_1$, and FIG. 16(*b*) shows scanning electric signals applied to the other scanning electrodes (non-selected scanning electrodes) $S_2$, $S_3$, $S_4$ . . . , etc. FIGS. 16(*c*) and 16(*d*) show electric signals of information applied to selected signal electrodes $I_1$, $I_3$ and $I_5$ and those applied to the non-selected signal electrodes $I_2$ and $I_4$, respectively. In FIGS. 16 and 17, the abscissa and the ordinate represent a time and a voltage, respectively. For instance, when a motion picture is displayed, a scanning electrode is sequentially and periodically selected from the group of scanning electrodes 152. If a threshold voltage for providing a first stable state of a liquid crystal cell having bistability with respect to predetermined applying times $t_1$ and $t_2$ is $-V_{th1}$ and that for providing a second stable state thereof is $+V_{th2}$, a scanning signal supplied to a selected scanning electrode 152 ($S_1$) is an alternating voltage showing 2V at a phase (time) $t_1$ and −2V at a phase (time) $t_2$ as shown in FIG. 16(*a*). When an electric signal having a plurality of phase periods of which voltage levels are different from each other is applied to the scanning electrode thus selected, a significant advantage is obtained that it is possible to cause state transition at a high speed between the first and second stable states corresponding to optically "dark" and "bright" states, respectively.

On the other hand, scanning electrodes $S_2$ to $S_5$ are placed in earthed condition, as shown in FIG. 16(*b*), and the potentials of their electric signals are made zero. Further, electric signals supplied to the selected signal electrodes $I_1$, $I_3$ and $I_5$ are V as shown in FIG. 16(*c*), and electric signals supplied to the non-selected signal electrodes $I_2$ and $I_4$ are −V, as shown in FIG. 16(*d*). In this example, the respective voltages are set to a desired value satisfying the following relationships:

$$V<V_{th2}<3V$$

$$-3V<-V_{th1}<-V$$

Voltage waveforms applied to, e.g. the picture elements A and B among the picture elements when such electric signals are given, are shown in FIGS. 17(*a*) and 17(*b*). Namely, as seen from these figures, a voltage of 3V above the threshold voltage $V_{th2}$ applied to the picture element A on the selected scanning line at phase $t_2$. Likewise, a voltage of −3V above the threshold voltage $-V_{th1}$ is applied to the picture element B on the same scanning line at phase $t_1$. Accordingly, the orientation of the liquid crystal molecules is determined depending upon whether a signal electrode is selected or not on a selected scanning line. Namely, when selected, the liquid crystal molecules are oriented to the first stable state, and when not selected, to the second stable state.

On the other hand, voltages applied to all picture elements are V or −V on non-selected scanning lines as shown in FIGS. 17(*a*) and 17(*b*), each being not above the threshold voltage. Accordingly, liquid crystal molecules in the picture elements on scanning lines except for selected ones maintain the orientation corresponding to the signal state obtained when last scanned. Namely, when a scanning electrode is selected, signals on the selected one line are written and the signal state can be maintained until the scanning electrode is next selected after the writing of one frame is completed. Accordingly, even if the number of scanning electrodes increases, the duty ratio substantially does not change, nor result in lowering of the contrast.

Figure 18A:
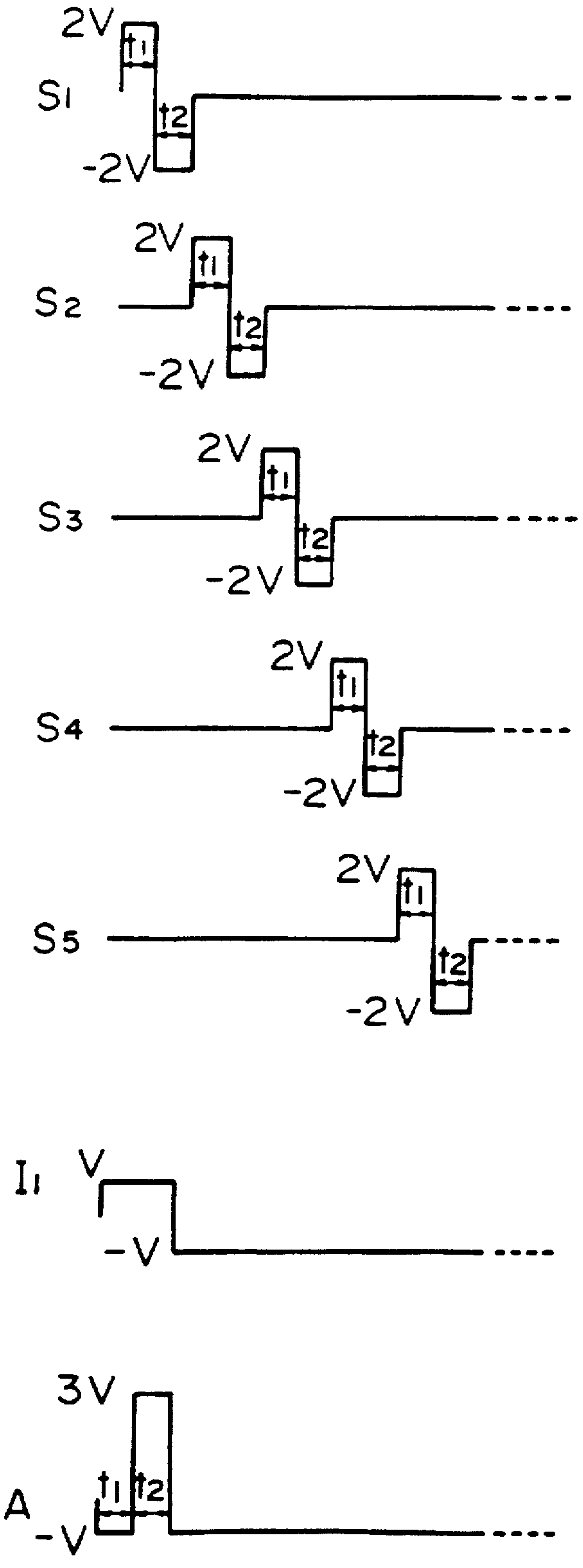
Figure 18B:
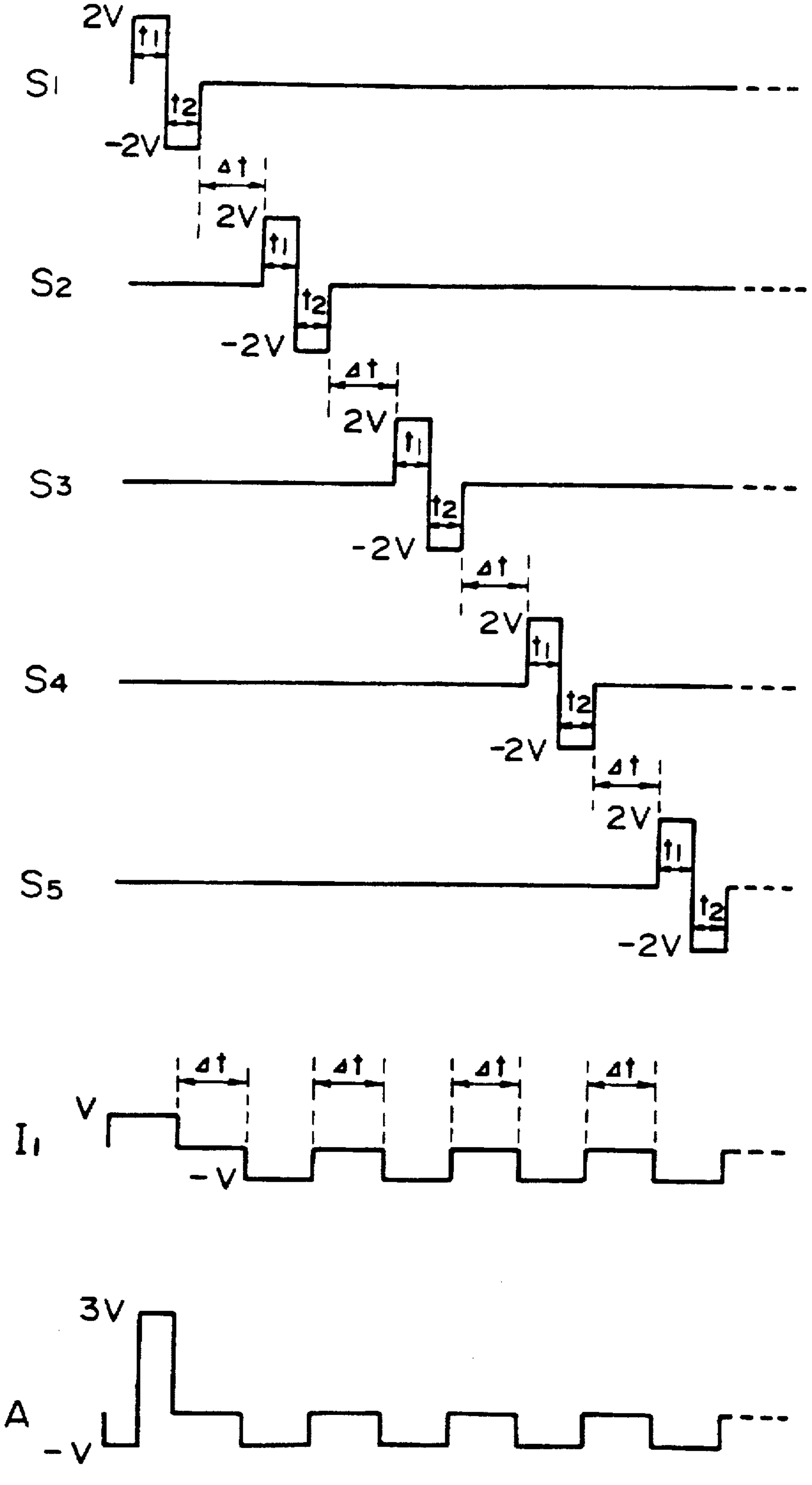

Then, problems which may actually occur when the liquid crystal device is driven as a display unit will be considered. In FIG. 15, it is assumed that the picture elements on dashed sections correspond to "bright" state while those on black sections correspond to "dark" state among picture elements formed at intersecting points of scanning electrodes $S_1$ to $S_5$ . . . and signal electrodes $I_1$ to $I_5$ . . . Now, if an attention is made to the representation on the signal electrode $I_1$ in FIG. 15, the picture element A correspondingly formed on the scanning electrode $S_1$ is placed in "bright" state while the other picture elements correspondingly formed on the signal electrode $I_1$ are all placed in "bright" state. FIG. 18(*a*) shows an embodiment of a driving method in this case where a scanning signal and an information signal supplied to the signal electrode $I_1$, and a voltage applied to the picture element A are indicated along the progress of time.

If the liquid crystal device is driven, e.g. as shown in FIG. 18(*a*), when the scanning signal $S_1$ is scanned, a voltage of 3V above the threshold voltage $V_{th2}$ is applied to the picture element A at a time of $t_2$. For this reason, independent of the previous states, the picture element A is switched to a stable state oriented in one direction, i.e. "bright" state. Thereafter, while the scanning signals $S_2$ to $S_5$ . . . are scanned, a voltage of −V is continuously applied as shown in FIG. 18(*a*). In this instance, because the voltage of −V does not exceed the threshold voltage $-V_{th1}$, the picture element A can maintain "bright" state. However, when a predetermined information is displayed in such a manner that one direction of signal (corresponding to "dark" state in this case) is continuously supplied to one signal electrode as stated above, the number of scanning lines extremely increases, and high speed driving of the liquid crystal device is required there occur some problems. This is explained by referring to the experimental data.

Figure 19:
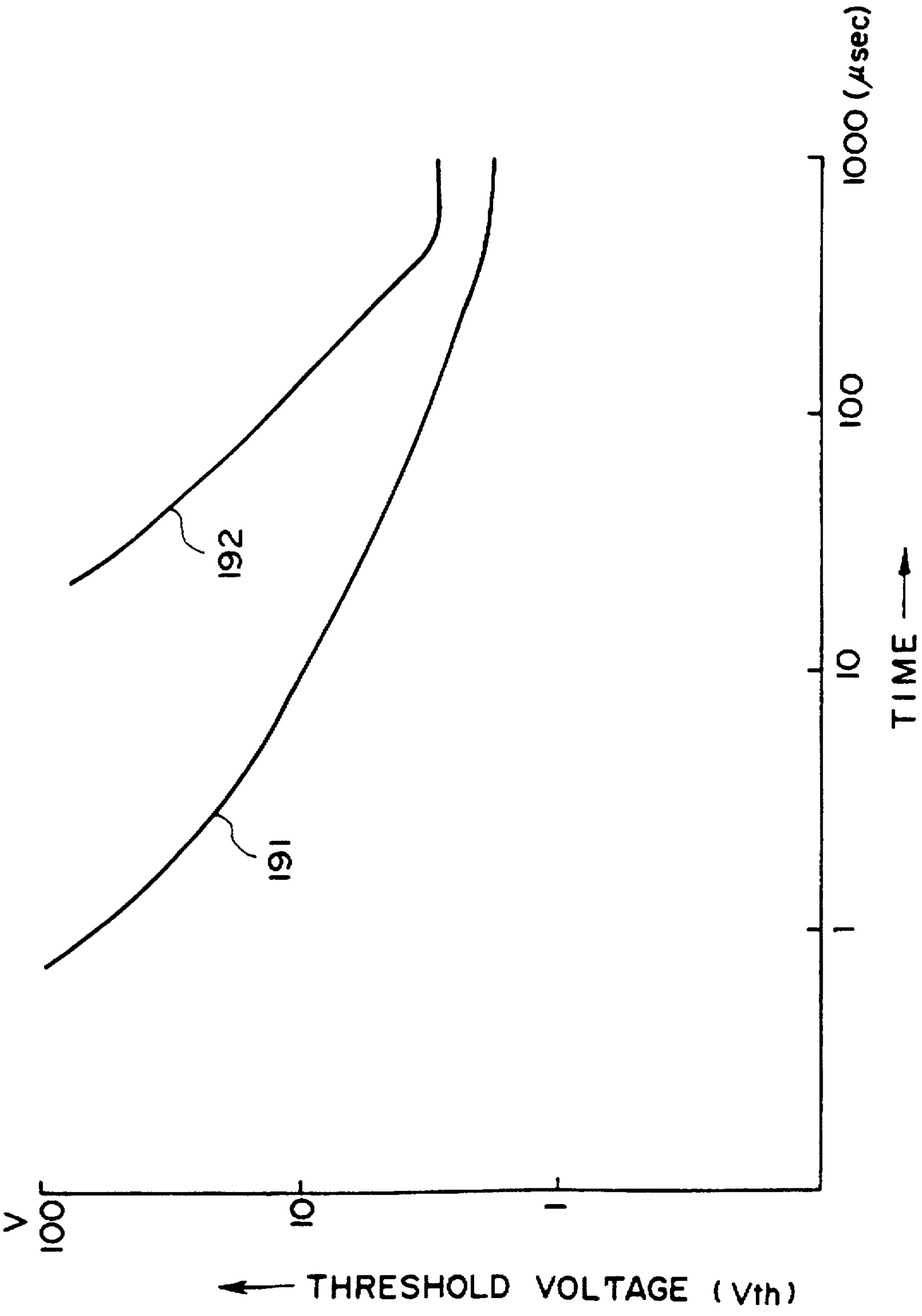
FIG. 19 is a graph showing how a voltage applying time depends upon a threshold voltage of a ferroelectric liquid crystal, FIG. 21(*a*) shows a block diagram illustrating an example of a driving circuit which is driven based on the time chart shown in FIG. 20, FIG. 21(*b*) shows waveforms each showing clock pulses (CS), an output of a data generator, and a signal (DM) of a data modulator to produce drive signals for a group of signal electrodes shown in FIG. 21(*a*), FIG. 21(*c*) shows an example of a circuit diagram for producing the output signal (DM) of the data modulator shown in FIG. 21(*b*)

FIG. 19 is a graph plotting an applied time dependency of a threshold voltage required for switching when DOBAMBC (designated by reference numeral 192 in FIG. 19) and HOBACPC (designated by reference numeral 191 in FIG. 19) were used as ferroelectric liquid crystal materials. In this example, the thickness of the liquid crystal was 1.6μ, and the temperature was maintained to be 70° C. In this experiment, as base plates between which a liquid crystal was hermetically interposed, e.g. glass plates on which ITO was vapor-deposited were used, and the threshold voltages $V_{th1}$ and $V_{th2}$ were nearly equal to each other, i.e. $V_{th1} \approx V_{th2}$ ($\equiv V_{th}$).

As seen from FIG. 19, it is understood that the threshold voltage $V_{th}$ has a dependency on the application time and becomes steeper according as an application time becomes shorter. As will be understood from the above-mentioned consideration, some problem occurs when a driving method as practised in FIG. 18(*a*) is employed, and when this driving method is applied to a device which has an extremely large number of scanning lines and is required to be driven at a high speed. Namely, for instance, even if the picture element A is switched to "bright" state at a time when the scanning electrode $S_1$ is scanned, a voltage of −V is always continuously applied after the concerned scanning is finished, whereby it is possible that the picture element is readily switched to the "dark" condition before the scanning of one image area is completed.

In order to prevent such as unfavorable phenomenon, a method as shown in FIG. 18(*b*) may be used. In accordance with this method, scanning signals and information signals are not successively supplied, but a predetermined time period Δt serving as an auxiliary signal applying period is provided to give an auxiliary signal allowing the signal electrodes to be earthed during this time period. During the auxiliary signal applying period, the scanning electrode is similarly placed in earthed condition, i.e. at zero volt applied between the scanning electrodes and signal electrodes. Thus, this makes it possible to substantially eliminate dependency when a voltage is applied at a threshold voltage of the ferroelectric liquid crystal shown in FIG. 19. Accordingly, it is possible to prevent that the "bright" state obtained in the picture element A is switched to the "dark" state. The same discussion is applicable to other picture elements.

This mode is characterized in that an information written once can be maintained over a period until the subsequent writing is effected, although the ferroelectric liquid crystal has characteristics as shown in FIG. 19.

Figure 20:
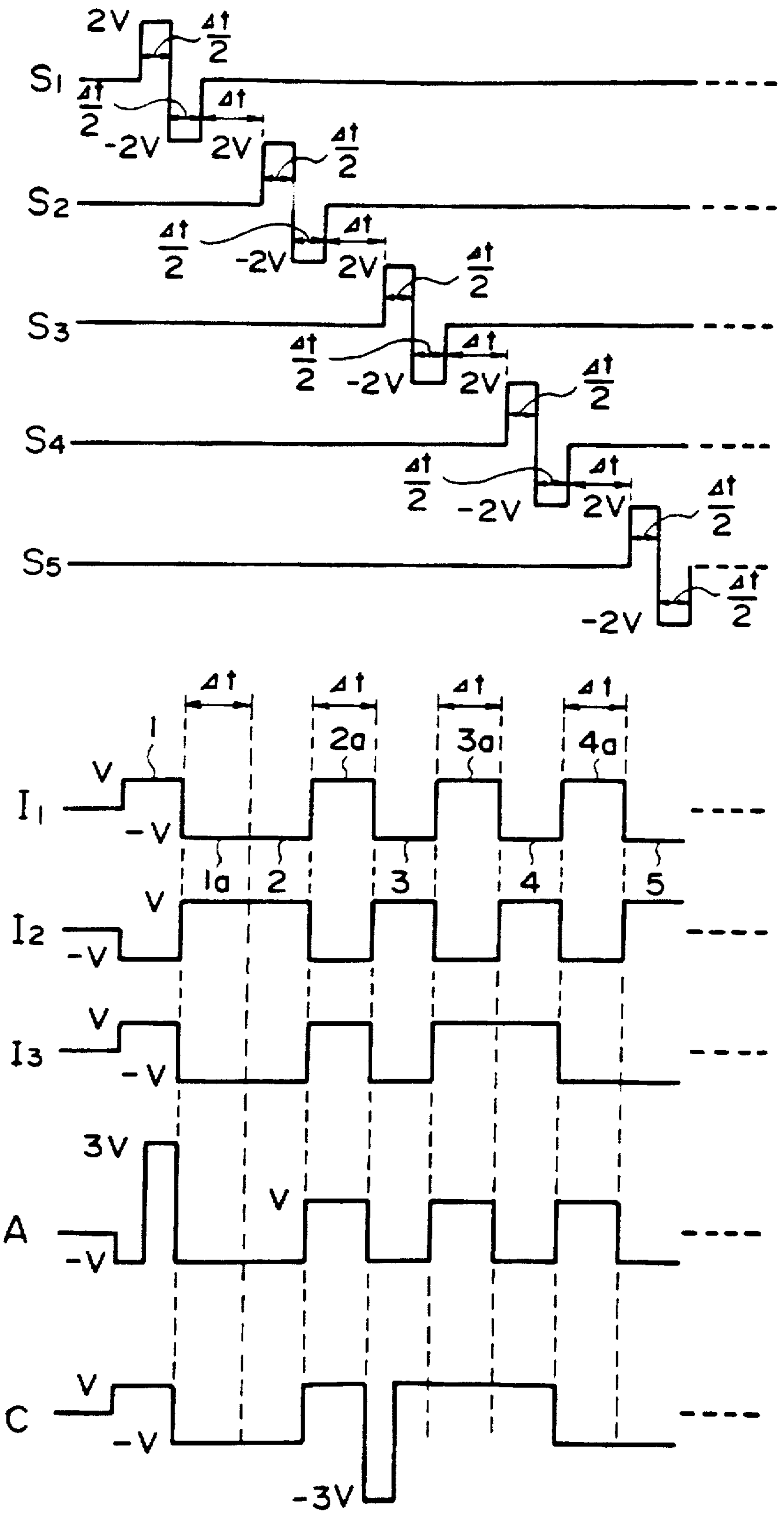

A preferred embodiment of this mode can be carried out by applying signals shown in a time chart of FIG. 20 to the scanning electrodes and the group of signal electrodes.

In FIG. 20, V is expressed as a predetermined voltage suitably determined by a liquid crystal material, a thickness of the liquid crystal, setting temperature, surface processing conditions of a base plate, etc. wherein scanning signals are pulses which alternate between ±2 volts. Each information signal supplied to the group of signal electrodes in synchronism with the pulses is a voltage of +V or −V corresponding to the information of "bright" or "dark", respectively. When scanning signals are viewed along the progress of time, a time period Δt serving as an auxiliary signal applying period is provided between the scanning electrode Sn (the n-th scanning electrode) and the scanning electrode $S_{n+1}$ (the n+1-th scanning electrode). During this time period when auxiliary signals having polarity opposite to those of signals when the scanning electrode is scanned are supplied to the group of signal electrode, time-sharing signals supplied to respective signal electrodes are shown by $I_1$ to $I_3$, e.g. in FIG. 20. Namely, auxiliary signals 1*a*, 2*a*, 3*a*, 4*a* and 5*a* shown in FIG. 20 have polarities opposite to those of information signals 1, 2, 3, 4 and 5, respectively. Accordingly, when a voltage applied to the picture element A shown in FIG. 20 is considered along time progress, even if the same information signal is successively supplied to one signal electrode, the dependency of voltage applying time with respect to the threshold voltage in the ferroelectric liquid crystal is cancelled, because a voltage actually applied to the picture element A is an alternating voltage lower than the threshold voltage $V_{th}$, whereby such a possibility is removed that a desired information (in this case, "bright") formed by scanning of scanning electrode $S_1$ is switched before the subsequent writing is carried out.

Figure 21A:
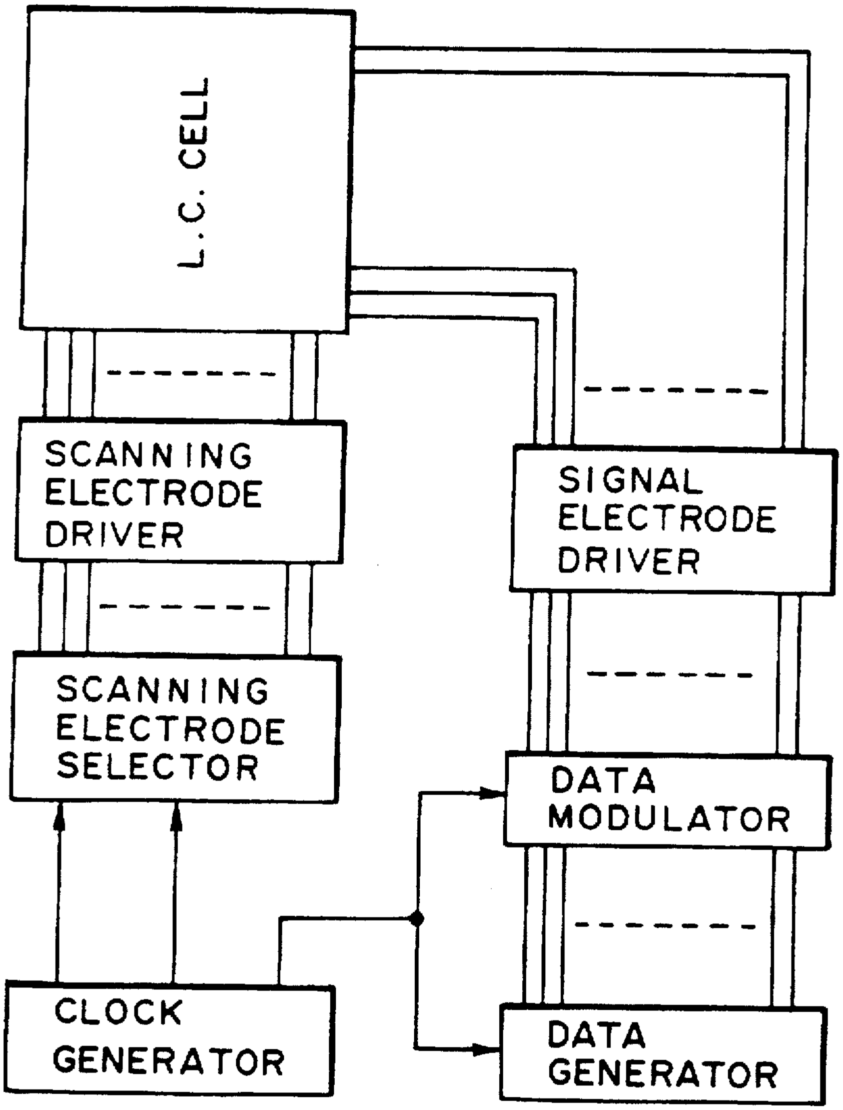
Figure 21B:
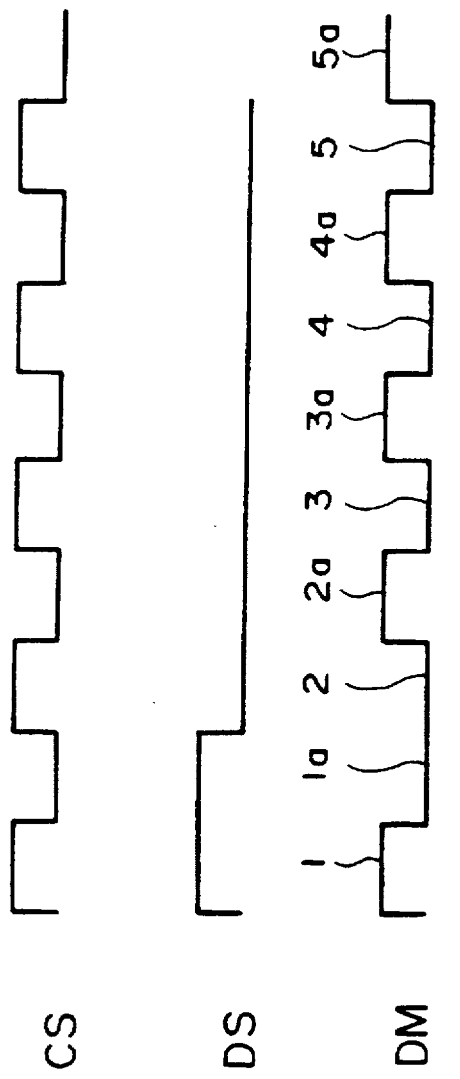
Figure 21C:
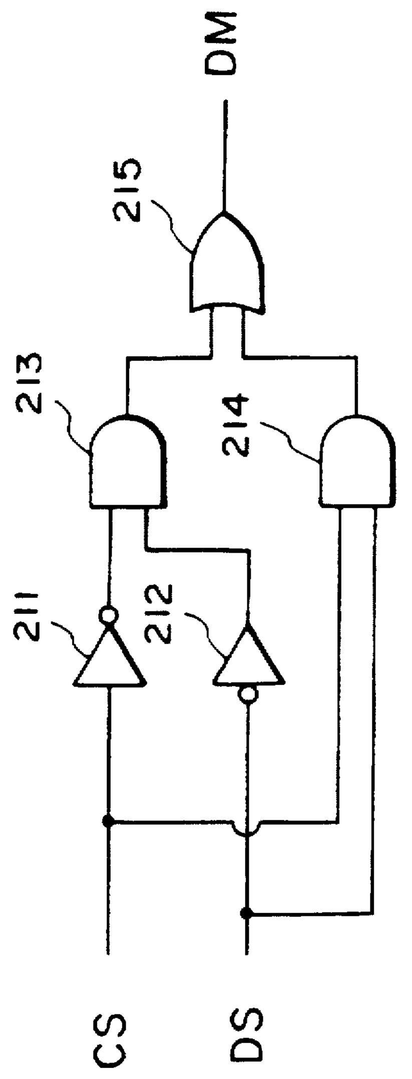

Referring to FIG. 21(*a*), there is shown a simplified electrical system diagram when a ferroelectric liquid crystal cell is driven in accordance with a driving scheme shown in FIG. 20. A liquid crystal cell is formed with a matrix electrode arrangement comprising a group of scanning electrodes and a group of signal electrodes as previously described. A scanning electrode driving circuit comprising a clock generator producing predetermined clock signals, a scanning electrode selector responsive to predetermined clock signals to produce selection signals for selecting scanning electrodes, and a scanning electrode driver responsive to selection signals to sequentially drive the group of the scanning electrodes. Scanning electrode drive signals supplied to the group of scanning electrodes is formed by supplying clock signals fed from the clock generator to the scanning electrode selector thereafter to supply selection signals fed from the scanning electrode selector to the scanning electrode driver.

On the other hand, a signal electrode driving circuit comprising the above-mentioned clock generator, a data generator producing data signals in synchronism with the clock signals, a data modulator to modulate data signals fed from the data generator in synchronism with clock signals to produce data modulation signals functioning as information signals and auxiliary signals, and a signal electrode driver responsive to data modulation signals to sequentially drive the group of signal electrodes. Signal electrode drive signals (DM) are formed by supplying outputs (DS) of the data generator to the data modulator in synchronism with clock signals to supply the information signals and the auxiliary signals obtained as outputs of data modulator to the signal driver.

FIG. 21(*b*) shows an example of signals which are output from the data modulator, which correspond to signals $I_1$ in the preceding embodiment in FIG. 20.

Referring to FIG. 21(*c*), there is shown an example of a circuit schematically showing the data modulator which outputs signals shown in FIG. 21(*b*). The modulator circuit shown in FIG. 21(*c*) comprises two intervers 211 and 212, two AND gates 213 and 214 and an OR gate 215.

Figure 22:
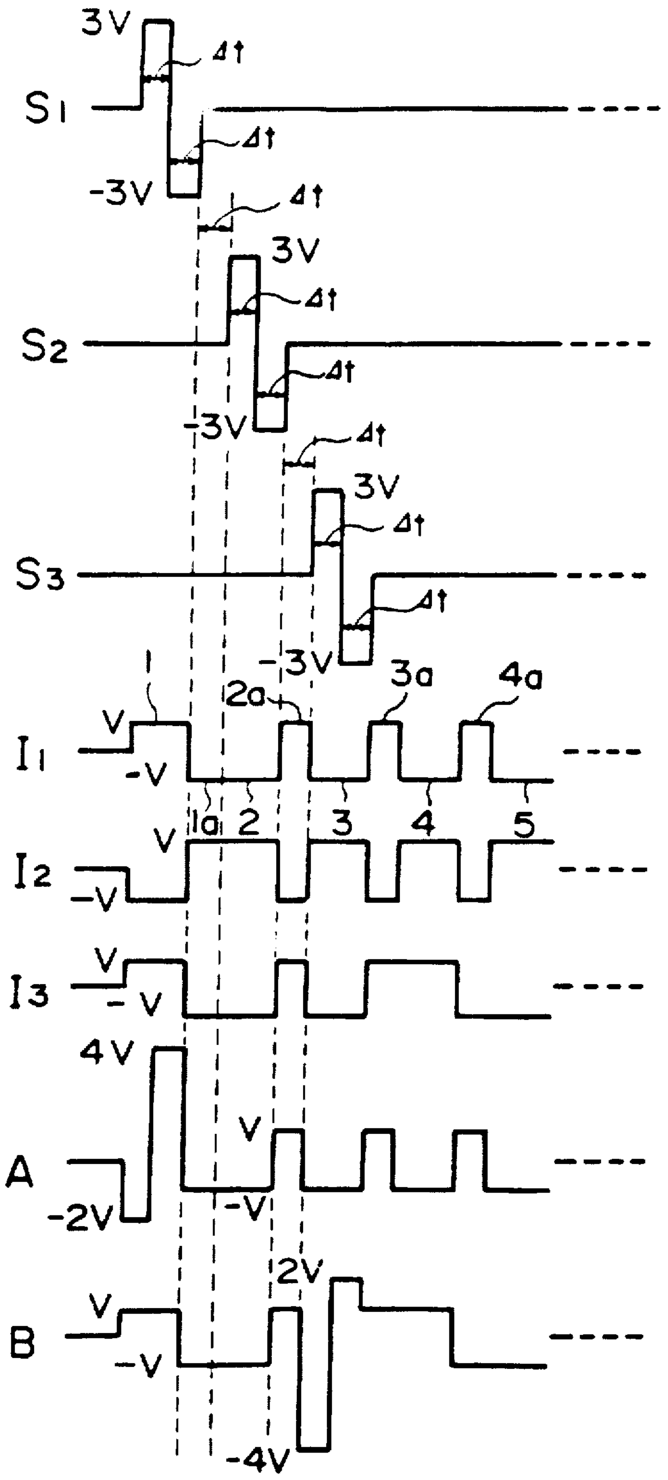

FIG. 22 shows a modified embodiment of this mode of the present invention. Instead of +2V pulse applied to a selected scanning electrode used in the embodiment shown in FIG. 20, the embodiment shown in FIG. 22 employs ±3V pulse.

In order to effectively perform the driving method according to the present invention, it is obvious that it is not necessarily required that electric signals supplied to scanning electrodes or signal electrodes are a simple symmetry rectangular wave as explained in the above-mentioned embodiment. For instance, it is possible to drive a liquid crystal device with a sine wave or triangular wave. Further, generally, it is possible to use a threshold voltage of different values $V_{th}$ in accordance with surface processing state of two base plates between a liquid crystal is interposed. Accordingly, when two base plates having different surface processing states are used, an asymmetry signal may be given with respect to a reference voltage such as zero voltage (earth) depending upon the difference between threshold voltages of two base plates. Moreover, in the above embodiment, an auxiliary signal obtained by inverting the latest information signal is used. However, an auxiliary signal obtained by inverting the polarity of a subsequent information signal may also be used. In this instance, a voltage with an absolute value different from those of the information signals may also be used. Furthermore, an auxiliary signal obtained by statistically processing not only the contents of the latest information signal but also a plurality of information signals used up to that time may also be used.

Figure 23:
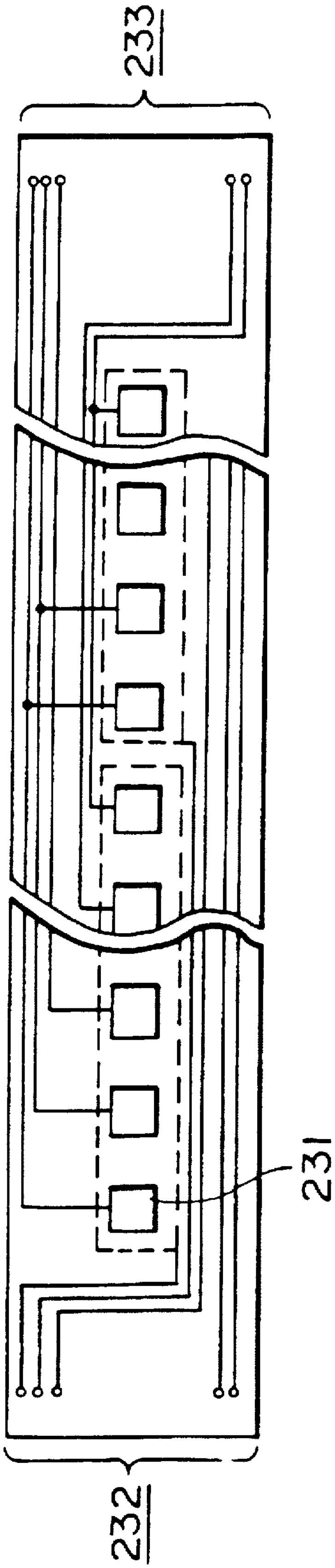
FIG. 23 is a plan view illustrating a liquid crystal-optical shutter to which a driving method according to the present invention is applied.

FIG. 23 shows a schematic plan view of a liquid crystal-optical shutter which is a preferable example device to which the above-mentioned driving method according to the present invention is applied. Reference numeral 231 denotes a picture element. Electrodes on the both sides are formed with a transparent material only at the area of the picture elements 231. The matrix electrode arrangement comprises a group of scanning electrodes 232 and a group of signal electrodes 233 oppositely spaced from the group of scanning electrodes 232.

The method according to the present invention can be widely applied to the field of optical shutters or displays, e.g. liquid crystal-optical shutter, liquid crystal televisions, etc.

What is claimed is:

1. A liquid crystal apparatus, comprising:

a liquid crystal device comprising a group of scanning electrodes and a group of signal electrodes intersecting each other to form an electrode matrix, and a chiral smectic liquid crystal having a threshold voltage varying depending on a voltage pulse width disposed so as to form a picture element at each intersection of the scanning electrodes and the signal electrodes, the chiral smectic liquid crystal being placed in a non-helical alignment structure, and drive means for:

(a) applying a scanning selection signal and a scanning non-selection signal to the scanning electrodes, (b) applying data signals to the signal electrodes so as to apply a voltage to a selected picture element at an intersection of a selected scanning electrode receiving the scanning selection signal and a selected signal electrode, said voltage applied to the selected picture element is at least two times a voltage applied to a non-selected picture element at an intersection of a non-selected scanning electrode receiving the scanning non-selection signal and a selected or non-selected signal electrode, (c) periodically applying the scanning selection signal to the scanning electrodes, and (d) setting a voltage level of said voltage according to a local environmental temperature, where each picture element in a period of receiving the scanning non-selection signal receives at least two types of voltage signal pulses having mutually different pulse widths including a voltage signal pulse having a larger pulse width which is set so as not to exceed the threshold voltage.

2. An apparatus according to claim 1, wherein said voltage applied to the selected picture element and said voltage applied to the non-selected picture element have a voltage difference therebetween which has a relative value with reference to a voltage difference between a voltage level of the scanning non-selection signal and a voltage level of a signal electrode not receiving any data signal.

3. An apparatus according to claim 2, wherein said relative value provides a non-zero DC component.

4. An apparatus according to claim 2, wherein said relative value is zero voltage.

5. An apparatus according to claim 1, wherein said chiral smectic liquid crystal is a liquid crystal developing ferroelectricity.

6. An apparatus according to claim 1, wherein said chiral smectic liquid crystal is disposed in an alignment state of suppressing its own helical structure.

* * * * *

UNITED STATES PATENT AND TRADEMARK OFFICE

CERTIFICATE OF CORRECTION

PATENT NO. : 5,790,449

DATED : August 4, 1998

INVENTOR(S): JUNICHIRO KANBE ET AL.

It is certified that error appears in the above-identified patent and that said Letters Patent is hereby corrected as shown below:

ON COVER PAGE AT [56], OTHER PUBLICATIONS

"Chem. Abstracts, vol. 93:56815r." should read --Chem. Abstracts, vol. 93:58615r.--.

AT [56], OTHER PUBLICATIONS

"Crustals," should read --Crystals,--.

COLUMN 1

Line 18, "array or," should read --array,--.

COLUMN 2

Line 14, "according" should read --accordingly,--;
Line 19, "lies" should read --lines--;
Line 33, "has" should read --have--.

UNITED STATES PATENT AND TRADEMARK OFFICE
CERTIFICATE OF CORRECTION

PATENT NO. : 5,790,449

DATED : August 4, 1998

INVENTOR(S): JUNICHIRO KANBE ET AL.

It is certified that error appears in the above-identified patent and that said Letters Patent is hereby corrected as shown below:

COLUMN 3

Line 6, "lessen," should read --lessened,--.

COLUMN 5

Line 29, "a signal" should read --signal--.

COLUMN 6

Line 26, "a selected" should read --selected--;
Line 31, "are" should read --is--;
Line 37, "an infor-" should read --infor---;
Line 43, "are" should read --is--.

COLUMN 8

Line 38, "Ragerwall" should read --Lagerwall--.

COLUMN 9

Line 26, "set a" should read --set to a--.

COLUMN 10

Line 7, "signal" should read --a signal--.

UNITED STATES PATENT AND TRADEMARK OFFICE
CERTIFICATE OF CORRECTION

PATENT NO. : 5,790,449

DATED : August 4, 1998

INVENTOR(S): JUNICHIRO KANBE ET AL.

It is certified that error appears in the above-identified patent and that said Letters Patent is hereby corrected as shown below:

COLUMN 11

Line 4, "electrode" should read --electrodes--;
Line 48, "element A" should read --elements A--;
Line 60, "retains" should read --retain--.

COLUMN 12

Line 13, "be" should read --to be--.

COLUMN 13

Line 37, "a selected" should read --selected--;
Line 61, "detail" should read --details--.

COLUMN 14

Line 27, "relationships;" should read --relationships:--;
Line 52, "maintains" should read --maintain--.

COLUMN 15

Line 10, "bistability the" should read --bistability of the--;
Line 45, "according" should read --accordingly,--;
Line 56, "elected" should read --selected--.

UNITED STATES PATENT AND TRADEMARK OFFICE

CERTIFICATE OF CORRECTION

PATENT NO. : 5,790,449

DATED : August 4, 1998

INVENTOR(S): JUNICHIRO KANBE ET AL.

It is certified that error appears in the above-identified patent and that said Letters Patent is hereby corrected as shown below:

COLUMN 16

Line 16, "chase" should read --phase--;
Line 57, "a image" should read --an image--.

COLUMN 18

Line 9, "element," should read --elements,--;
Line 42, "depends" should read --depend--.

COLUMN 19

Line 36, "corresponding" should read --(corresponding-- and "presence" should read --the presence--.

COLUMN 22

Line 1, "according" should read --accordingly,--.

UNITED STATES PATENT AND TRADEMARK OFFICE
CERTIFICATE OF CORRECTION

PATENT NO. : 5,790,449

DATED : August 4, 1998

INVENTOR(S): JUNICHIRO KANBE ET AL.

It is certified that error appears in the above-identified patent and that said Letters Patent is hereby corrected as shown below:

COLUMN 24

Line 24, "structure," should read --structure;--.

Signed and Sealed this

Fourth Day of May, 1999

Attest:

Q. TODD DICKINSON

*Attesting Officer*

*Acting Commissioner of Patents and Trademarks*